(12) United States Patent
Mitlitsky et al.

(10) Patent No.: US 8,277,992 B2
(45) Date of Patent: Oct. 2, 2012

(54) METHOD OF OPTIMIZING OPERATING EFFICIENCY OF FUEL CELLS

(75) Inventors: Fred Mitlitsky, Livermore, CA (US); K. R. Sridhar, Los Gatos, CA (US); Matthias Gottmann, Sunnyvale, CA (US); Swaminathan Venkataraman, Cupertino, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

(21) Appl. No.: 13/286,749

(22) Filed: Nov. 1, 2011

(65) Prior Publication Data

US 2012/0052406 A1 Mar. 1, 2012

Related U.S. Application Data

(60) Division of application No. 12/458,341, filed on Jul. 8, 2009, now Pat. No. 8,071,246, which is a continuation of application No. 10/866,238, filed on Jun. 14, 2004, now Pat. No. 7,575,822, which is a continuation-in-part of application No. 10/653,240, filed on Sep. 3, 2003, now Pat. No. 7,364,810, which is a continuation-in-part of application No. 10/446,704, filed on May 29, 2003, now Pat. No. 7,482,078.

(60) Provisional application No. 60/461,190, filed on Apr. 9, 2003.

(51) Int. Cl.
*H01M 8/04* (2006.01)
*H01M 8/06* (2006.01)
*H01M 8/12* (2006.01)

(52) U.S. Cl. .......................... 429/430; 429/428; 429/444

(58) Field of Classification Search .................. None
See application file for complete search history.

(56) References Cited

U.S. PATENT DOCUMENTS

| | | | |
|---|---|---|---|
| 3,488,266 A | 1/1970 | French et al. |
| 4,041,210 A | 8/1977 | Van Dine |
| 4,182,795 A | 1/1980 | Baker et al. |
| 4,532,192 A | 7/1985 | Baker et al. |
| 4,792,502 A | 12/1988 | Trocciola et al. |
| 4,898,792 A | 2/1990 | Singh et al. |
| 4,917,971 A | 4/1990 | Farooque |
| 4,983,471 A | 1/1991 | Reichner et al. |
| 5,034,287 A | 7/1991 | Kunz |
| 5,047,299 A | 9/1991 | Shockling |

(Continued)

FOREIGN PATENT DOCUMENTS

EP 1233467 A2 8/2002

(Continued)

OTHER PUBLICATIONS

Soren Hojgaard Jensen et al., "High Temperature Electrolysis of Steam and Carbon Dioxide," Proceedings of Riso International Energy Conference, held at Riso National Laboratory, Denmark, May 19-21, 2003, Riso-R-1405(CN), pp. 204-215, L.S. Peterson and H. Jensen, eds.

(Continued)

*Primary Examiner* — John S Maples
(74) *Attorney, Agent, or Firm* — The Marbury Law Group PLLC

(57) ABSTRACT

A method of operating a fuel cell electrochemical system includes receiving at least one of a cost of electricity and a cost of fuel and adjusting at least one of an operating efficiency and throughput of the fuel cell based on the at least one of the received cost of electricity and the received cost of fuel.

3 Claims, 10 Drawing Sheets

U.S. PATENT DOCUMENTS

| | | | |
|---|---|---|---|
| 5,084,362 A | 1/1992 | Farooque |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,527,631 A | 6/1996 | Singh et al. |
| 5,573,867 A | 11/1996 | Zafred et al. |
| 5,601,937 A | 2/1997 | Isenberg |
| 5,686,196 A | 11/1997 | Singh et al. |
| 5,733,675 A | 3/1998 | Dederer et al. |
| 5,741,605 A | 4/1998 | Gillett et al. |
| 5,900,330 A | 5/1999 | Kagatani |
| 5,955,039 A | 9/1999 | Dowdy |
| 6,013,385 A | 1/2000 | DuBose |
| 6,033,794 A | 3/2000 | George et al. |
| 6,051,125 A | 4/2000 | Pham et al. |
| 6,280,865 B1 | 8/2001 | Eisman et al. |
| 6,329,090 B1 | 12/2001 | McElroy et al. |
| 6,403,245 B1 | 6/2002 | Hunt |
| 6,436,562 B1 | 8/2002 | DuBose |
| 6,451,466 B1 | 9/2002 | Grasso et al. |
| 6,531,243 B2 | 3/2003 | Thom |
| 6,569,298 B2 | 5/2003 | Merida-Donis |
| 6,623,880 B1 | 9/2003 | Geisbrecht et al. |
| 6,673,479 B2 | 1/2004 | McArthur et al. |
| 6,821,663 B2 | 11/2004 | McElroy et al. |
| 7,014,932 B2 | 3/2006 | Halter et al. |
| 7,045,238 B2 | 5/2006 | Gottmann et al. |
| 7,201,979 B2 | 4/2007 | McElroy et al. |
| 7,364,810 B2 | 4/2008 | Sridhar et al. |
| 7,482,078 B2 | 1/2009 | Sridhar et al. |
| 7,575,822 B2 | 8/2009 | Mitlitsky et al. |
| 2002/0028362 A1 | 3/2002 | Prediger et al. |
| 2003/0162067 A1 | 8/2003 | McElroy |
| 2003/0167105 A1 | 9/2003 | Colborn |
| 2003/0196893 A1 | 10/2003 | McElroy et al. |
| 2004/0013923 A1 | 1/2004 | Molter et al. |
| 2004/0115489 A1 | 6/2004 | Goel |

FOREIGN PATENT DOCUMENTS

| | | |
|---|---|---|
| WO | 200069773 A1 | 11/2000 |
| WO | 200210877 A2 | 2/2002 |
| WO | 2003094320 A2 | 11/2003 |
| WO | 2004025767 A2 | 3/2004 |
| WO | 2004049479 A2 | 6/2004 |
| WO | 2004093214 A2 | 10/2004 |

OTHER PUBLICATIONS

K. Ledjeff et al., "Regenerative Fuel Cell for Energy Storage in PV Systems," Proceedings of the 26th Intersociety Energy Conversion Engineering Conference, vol. 3, Conf. 26, Aug. 1991, pp. 538-541.

L.G. Austin, "Cell and Stack Construction: Low-Temperature Cells," NASA SP-120, 1967.

"Low Cost, Compact Solid Oxide Fuel Cell Generator," NASA Small Business Innovation Research Program NREL/CP-570-30535.

"Low Cost, High Efficiency Reversible Fuel Cell (and Electrolyzer) Systems," Proceedings of the 2001 DOE Hydrogen Program Review, NREL/CP-570-30535.

"Low Cost, High Efficiency Reversible Fuel Cell Systems," Proceedings of the 2002 U.S. DOE Hydrogen Program Review, NREL/CP-610-32405, pp. 1-14.

"Low Cost Reversible Fuel Cell System," Proceedings of the 2002 U.S. DOE Hydrogen Program Review, Jun. 15, 2000, NREL/CP-570-28890, pp. 1-9.

F. Mitlitsky et al., "Regenerative Fuel Cells for High Altitude Long Endurance Solar Powered Aircraft," 28th Intersociety Energy Conversion Engineering Conference (IECEC), UCRL-JC-113485, Jul. 28, 1993.

Small, Ultra Efficient Fuel Cell Systems, Advanced Technology Program ATP 2001 Competition, Jun. 2002, pp. 1-2.

F. Mitlitsky, "Unitized Regenerative Fuel Cells for Solar Rechargeable Aircraft and Zero Emission Vehicles," 1994 Fuel Cell Seminar, UCRL-JC-117130, Sep. 6, 1994.

METHOD OF OPTIMIZING OPERATING EFFICIENCY OF FUEL CELLS

BACKGROUND OF THE INVENTION

This application is a divisional of U.S. application Ser. No. 12/458,341, filed Jul. 8, 2009, now U.S. Pat. No. 8,071,246, which is a continuation of U.S. application Ser. No. 10/866,238, filed Jun. 14, 2004, now U.S. Pat. No. 7,575,822, which is a continuation-in-part of U.S. application Ser. No. 10/446,704 filed on May 29, 2003, now U.S. Pat. No. 7,482,078, which claims benefit of priority of U.S. Provisional Application Ser. No. 60/461,190 filed on Apr. 9, 2003, all of which are incorporated by reference in their entirety. U.S. application Ser. No. 10/866,238 is also a continuation-in-part of U.S. application Ser. No. 10/653,240 filed on Sep. 3, 2003 now U.S. Pat. No. 7,364,810, which is incorporated by reference in its entirety.

The present invention is generally directed to fuel cells and more specifically to fuel cell operation.

Fuel cells are electrochemical devices which can convert energy stored in fuels to electrical energy with high efficiencies. There are classes of fuel cells that also allow reversed operation, such that oxidized fuel can be reduced back to unoxidized fuel using electrical energy as an input. The ability to generate electricity and regenerate fuel makes these fuel cells suitable for electrical energy storage. The fuel cells are usually operated at a predetermined optimum operating efficiency and/or throughput. The optimum operating efficiency is calculated for each fuel cell based on various fuel cell structural and operating parameters, such as fuel cell size, materials, fuel used, fuel flow rate, etc.

BRIEF SUMMARY OF THE INVENTION

One preferred aspect of the present invention provides a method of operating a fuel cell electrochemical system comprising receiving at least one of a cost of electricity and a cost of fuel and adjusting at least one of an operating efficiency and throughput of the fuel cell based on the at least one of the received cost of electricity and the received cost of fuel.

Another preferred aspect of the present invention provides fuel cell electrochemical system, comprising a fuel cell, and a first means for adjusting at least one of operating efficiency and throughput of the fuel cell based on at least one of a received cost of electricity and a received cost of fuel.

Another preferred aspect of the present invention provides a fuel cell electrochemical system, comprising a fuel cell, and a program product comprising machine-readable program code located in a machine readable medium for adjusting at least one of operating efficiency and throughput of the fuel cell based on at least one of a received cost of electricity and a received cost of fuel.

DETAILED DESCRIPTION OF THE PREFERRED EMBODIMENT

Figure 1:
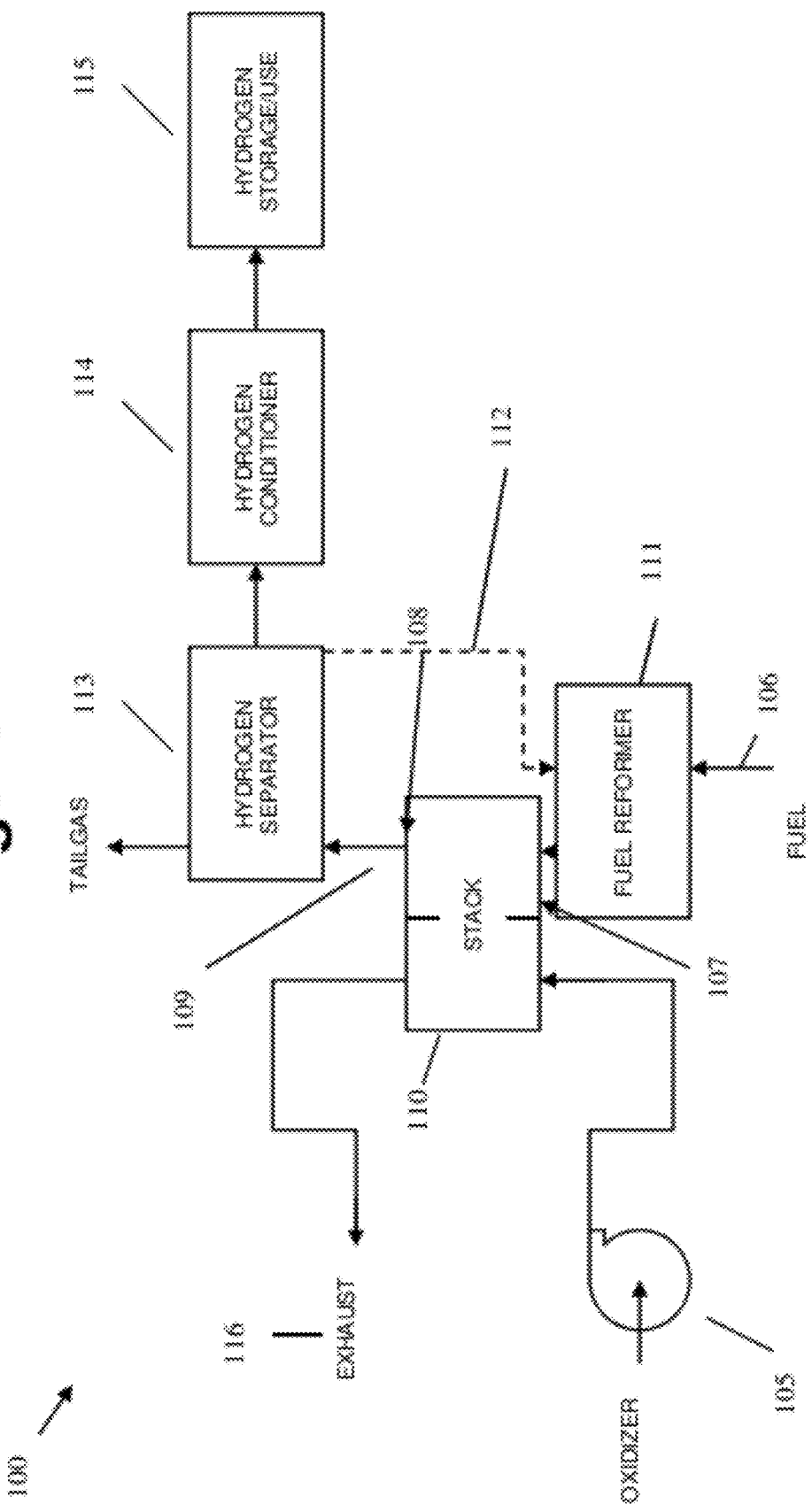
FIG. 1 is schematic of an electrochemical fuel cell system according to the first preferred embodiment of the present invention.

The present inventors have realized that a fuel cell does not necessarily have to operate at an optimum operating efficiency and/or optimum throughput and that the operating efficiency and/or throughput of the fuel cell may be adjusted (i.e., raised or lowered) based on at least one of the cost of electricity and the cost of fuel. The term "cost of electricity" includes the cost of electricity provided by electricity suppliers to consumers (i.e., the price of electricity charged by a utility), the cost that the electricity suppliers are willing to pay for electricity provided back to them (i.e., price of electricity paid by a utility), as well as the difference between these values. The term "cost of fuel" includes the price of fuel provided from fuel suppliers, the price of fuel that may be charged by the electrochemical system operator and the differences between these values. The term "optimum operating efficiency" refers to the designed optimum or maximum operating efficiency of the fuel cell for a particular application.

Reversible or regenerative fuel cells operate in a fuel cell mode to generate electricity from supplied fuel and oxidizer and in an electrolysis mode to generate fuel and oxidizer when electricity is provided to the fuel cell. Non-reversible (i.e., non-regenerative or primary) fuel cells operate in a single mode to generate electricity from supplied fuel and oxidizer. For convenience, this single mode of operation of the non-reversible fuel cells will also be referred herein as the fuel cell mode. The term "optimum throughput" refers to a designed or optimum amount of electricity generated by a reversible or non-reversible fuel cell in the fuel cell mode or a designed or optimum amount of fuel generated by a reversible fuel cell in the electrolysis mode.

When a regenerative or a non-regenerative fuel cell is operated in a fuel cell mode to generate electricity, the operating efficiency and/or throughput of the fuel cell may be adjusted for operation in the fuel cell mode. When the cost of electricity is high, such as higher than a predetermined cost, and/or when the cost of fuel is low, such as lower than a predetermined cost, the operating efficiency of the fuel cell operating in the fuel cell mode is adjusted below the predetermined optimum efficiency to increase an electricity generation rate (i.e., the throughput) of the fuel cell. Thus, the throughput is increased above the optimum throughput. The term "predetermined cost" refers to a cost at which it becomes cost effective or profitable to operate the fuel cell below its optimum operating efficiency to achieve an increased throughput. Preferably, the excess heat generated by the fuel cell operating below its optimum efficiency, but with a higher throughput, is stored for later use. The heat may be stored in any suitable heat sink, heat storage material or heat storage device.

When the cost of electricity is low, such as lower than the predetermined cost, and/or when the cost of fuel is high, such as higher than the predetermined cost, the operating efficiency of the reversible or non-reversible fuel cell operating in the fuel cell mode is adjusted to be about equal to an optimum efficiency to decrease the electricity generation rate of the fuel cell (i.e., to decrease the throughput to be about equal to an optimum throughput). The term "about equal to an optimum efficiency" includes designed operation of the fuel cell to be as close as possible to the optimum efficiency as allowed by the operating parameters, taking into consideration routine variance of the fuel cell efficiency due to internal and external factors during a given time of operation. For example, this term includes operating the fuel cell at an efficiency within 10% of its designed optimum efficiency. The term "about equal to an optimum throughput" refers to the throughput at the about optimum efficiency.

Preferably, additional heat is provided to the reversible or non-reversible fuel cell operating at about the optimum operating efficiency. For example, the heat stored from the fuel cell operating at below optimum efficiency may be provided back to the fuel cell as additional heat when the fuel cell operates at the optimum efficiency. Alternatively, the additional heat may be provided to the fuel cell from at least one of an external renewable heat source (such as a geothermal or solar heat source), an external non-renewable heat source (such as from another fuel cell or fuel cell stack, from another reactor or from an external heating device), and heat from balance of plant components of the electrochemical system.

Thus, during periods of exceptionally expensive cost of electricity and/or exceptionally inexpensive cost of fuel, it may be advantageous to operate the reversible or non-reversible fuel cell in the fuel cell mode with higher throughput at the expense of efficiency. Excess heat can be stored during such periods of reduced efficiency fuel cell operation for later use for increasing the thermally sustainable voltage of the system during fuel cell operation, and/or for reversible fuel cells, for decreasing the thermally sustainable voltage of the system during electrolysis operation.

When the reversible or regenerative fuel cell is operated in the electrolysis mode, the operating efficiency and throughput of the fuel cell may be adjusted for operation in the electrolysis mode. When the cost of electricity is low, such as lower than a predetermined cost, and/or when the cost of fuel is high, such as higher than a predetermined cost, the operating efficiency of the regenerative fuel cell operating in the electrolysis mode is adjusted below an optimum efficiency to increase a fuel generation rate of the fuel cell (i.e., to increase the throughput above the optimum throughput). The predetermined electricity cost for the fuel cell mode may be the same as or different from the predetermined electricity cost for the electrolysis mode. The predetermined fuel cost for the fuel cell mode may be the same as or different from the predetermined fuel cost for the electrolysis mode. Preferably, the heat generated by the fuel cell operating below optimum efficiency is stored for later use.

When the cost of electricity is high, such as higher than the predetermined cost, and/or when the cost of fuel is low, such as lower than the predetermined cost, the operating efficiency of the regenerative fuel cell operating in the electrolysis mode is adjusted to be about equal to an optimum efficiency to decrease the fuel generation rate of the fuel cell (i.e., to decrease the throughput to be about equal to the optimum throughput). Preferably, additional heat is provided to the fuel cell operating at about the optimum operating efficiency.

The cost of the fuel generated in the electrolysis mode is dependent on the cost of electricity and efficiency of the electrolysis system. During periods when the cost of electricity is low, it may be cost effective to operate the electrolysis system at higher fuel generation rates with lower efficiency. Excess heat can be stored during such periods of reduced efficiency electrolysis operation.

The stored heat can be used to reduce the thermally sustainable voltage of the system during later periods of electrolysis operation, when the cost of electricity is high and it is more desirable to optimize efficiency at the expense of throughput. Thus, the additional heat may be provided to the regenerative fuel cell operating in the electrolysis mode at about the optimum efficiency from heat stored during fuel cell operation in the fuel cell mode and/or in the electrolysis mode at an efficiency below the optimum efficiency. Alternatively, the additional heat may be provided to the fuel cell from at least one of an external renewable heat source, an external non-renewable heat source, and heat from balance of plant components of the electrochemical system. Of course the additional heat may be provided from both the stored heat and from external and/or balance of plant component heat sources.

Furthermore, the stored heat from the operation in the electrolysis mode can be used to increase the thermally sustainable voltage of the system during later operation in the fuel cell mode at optimum efficiency when the electricity is relatively inexpensive and/or when the fuel is relatively expensive.

The preferred modes of operation of the reversible fuel cell electrochemical system is summarized in Table I below. It should be noted that any one or more of the modes provided in Table I may be used in any suitable combination and that a non-reversible or primary fuel cell may also be used.

TABLE I

| | HIGH COST OF ELECTRICITY AND/OR LOW COST OF FUEL | LOW COST OF ELECTRICITY AND/OR HIGH COST OF FUEL |
|---|---|---|
| ELECTROLYSIS MODE | Optimum efficiency Provide heat to fuel cell Low fuel generation rate/ optimum throughput | Below optimum efficiency Fuel cell generates excess heat for storage High fuel generation rate/above optimum throughput |
| FUEL CELL MODE | Below optimum efficiency Fuel cell generates excess heat for storage High electricity generation rate/above optimum throughput | Optimum efficiency Provide heat to fuel cell Low electricity generation rate/ optimum throughput |

Thus, as summarized in Table I, the heat generated by the fuel cell when the fuel cell operates in at least one of fuel cell and electrolysis modes at an efficiency lower than an optimum efficiency is preferably but not necessarily stored. Additional heat is preferably provided to the fuel cell when the fuel cell operates in at least one of fuel cell and electrolysis modes at the optimum efficiency. The additional heat may comprise at least one of the stored heat from the fuel cell operation in at least one of fuel cell and electrolysis modes below optimum operating efficiency and heat from external and/or balance of place heat sources. The heat is preferably provided when the fuel cell operates in the fuel cell mode to increase a thermally sustainable voltage of the fuel cell and/or the heat is preferably provided when the regenerative fuel cell operates in the electrolysis mode to decrease a thermally sustainable voltage of the fuel cell.

The heat may be stored in any suitable heat sink, heat storage material or heat storage device. For example, the heat sink may comprise a gas tank and an absorbent bed, such as a zeolite bed, or it may comprise a hydrogen fuel tank containing a metal hydride hydrogen storage material, as described in U.S. application Ser. No. 10/636,446, incorporated herein by reference. For example, gas adsorption/desorption may be used to store and release heat as follows. A gas tank, such as a $CO_2$ gas tank, is connected by a valved pipe to an adsorbent material bed, such as a zeolite bed. During the fuel cell mode, the gas is desorbed from the bed to the tank by the heat provided from depleted air from the fuel cell passing in a pipe near, through or in thermal contact with the bed. During the electrolysis mode, the gas is adsorbed into the bed from the tank and releases heat to a second pipe to heat water passing through this second pipe into the fuel cell. The second pipe may be located near, through or in thermal contact with the bed. If hydrogen absorption is used to store heat and release heat, then a hydrogen storage tank containing a metal hydride hydrogen storage material is used instead of the $CO_2$ tank and zeolite bed. The hydrogen that is used as fuel or fuel exhaust in the fuel cell may be used to fill the tank.

Preferably, but not necessarily, the cost of electricity and/or fuel data may be intermittently or continuously provided to the electrochemical system. For example, the data may be provided intermittently into the system by a human operator through a control panel, which may be a computer keyboard or another type of control panel. Alternatively, the data may be electronically provided (continuously or intermittently) to the electrochemical system. For example, the cost of electricity and/or fuel data may be provided to a computer in the electrochemical system via the internet or wirelessly from a data source, such as a price data base or a utility price quote. The electrochemical system contains a general purpose or a special purpose computer or application specific integrated circuit (ASIC) which contain at least one of a keyboard, internet input and/or wireless input through which it receives the cost of electricity and/or fuel data. The computer or ASIC then determines or calculates the desired operating efficiency and/or throughput and automatically adjusts the fuel cell operating efficiency and/or throughput based on the received cost of electricity and/or fuel. The computer contains a program product comprising machine-readable program code located in a machine readable medium for adjusting the operating efficiency and/or throughput of the fuel cell based on the received cost of electricity and/or fuel. The program product may be any suitable system control software which automatically controls fuel cell efficiency and/or throughput based on the received data.

Alternatively, the cost of electricity and/or fuel is not provided into the system directly. Instead, the cost is provided to the system operator or to another person associated with the system. For example, the cost may be provided via the internet or wirelessly to a computer or data processing device that is external to the system or the cost may be provided via fax, newsletter, mail, email or telephone. The operator then adjusts the fuel cell operating efficiency and/or throughput through a control panel based on the cost of electricity without actually entering the cost of electricity and/or fuel into the computer, control panel or other control device which controls the electrochemical system. Thus, the system contains a means, such as a computer, an ASIC or an operator operated control panel for adjusting the operating efficiency and/or throughput of the fuel cell.

Furthermore, if desired, the fuel cell operating efficiency and/or throughput may also be adjusted based on both the cost of electricity and the cost of fuel. In this case, the computer or a human associated with the system performs a calculation or determination to determine whether the fuel cell should be operated below the optimum efficiency and/or above the optimum throughput based on the cost of both electricity and fuel. In other words, the cost of operating the electrochemical system is optimized based on the difference in cost of electricity and fuel from respective, predetermined cost amounts, and then the operating efficiency and/or throughput of the fuel cell is adjusted based on this determination.

The operating efficiency of the fuel cell may be controlled by one or more of the following methods. For example, the fuel cell current density may be varied to adjust the efficiency of the fuel cell. Alternatively, the fuel cell temperature to the fuel cell may be varied to adjust the fuel cell operating efficiency. Alternatively, the fuel cell throughput and/or the reactant flow rate may be varied to adjust the fuel cell operating efficiency. The throughput may be adjusted by using the fuel cell system control panel.

Any suitable fuel cells may be used in the electrochemical system. Preferably, the fuel cells comprise solid oxide fuel cells (SOFCs), such as non-regenerative SOFCs or solid oxide regenerative fuel cells (SORFCs). However, other high temperature fuel cells, such as molten carbonate fuel cells, and low temperature fuel cells, such as PEM or direct methanol fuel cells, may also be used. Furthermore, it is preferred that the electrochemical system contains a plurality of fuel cells, which may be arranged in one or more stacks.

In a first preferred embodiment, the electrochemical fuel cell system is used to generate additional hydrogen for use outside the system when the fuel cell operates in the fuel cell mode. In a second preferred embodiment, the electrochemical fuel cell system is used to generate additional hydrogen or other fuel for use outside the system when the regenerative fuel cell operates in the electrolysis mode. In a third preferred embodiment, the electrochemical fuel cell system is used to generate additional hydrogen for use outside the system when the regenerative fuel cell operates in the fuel cell mode and in the electrolysis mode. The fuel cell may be operated to generate the additional hydrogen when the cost of electricity and/or fuel makes such generation economically favorable. It should be noted that the electrochemical system does not have to produce additional hydrogen for use outside the system.

In the first preferred embodiment where additional hydrogen is generated for use outside the system when the fuel cell operates in the fuel cell mode, a carbon containing fuel, such as a hydrocarbon fuel, and an oxidizer, such as air, are provided into the fuel cell. A fuel side exhaust stream is generated from the fuel cell while the fuel and the oxidizer are provided into the fuel cell operating in the fuel cell mode. At least a portion of hydrogen from the fuel side exhaust stream is separated during the fuel cell mode and at least a portion of the separated hydrogen is provided to a hydrogen storage vessel or to a hydrogen using device.

Preferably, a variable amount of separated hydrogen my be provided based on predetermined criteria or based on received data. For example, a variable ratio of an amount of electricity generated to an amount of separated hydrogen may be provided. The variable amount of separated hydrogen may be controlled based on comparing the provided cost of electricity received by the electrochemical system to a predetermined cost of electricity. Preferably, the cost of electricity is electronically provided to the system and the system automatically compares the received cost of electricity to the predetermined cost of electricity. The system automatically controls the variable amount of separated hydrogen based on the step of comparing.

A high temperature electrochemical system, such as a solid oxide electrochemical system, such as a SOFC or a SORFC system, or a molten carbonate fuel cell system, can be used to co-produce hydrogen and electricity in the fuel cell mode. The system of the first preferred embodiment generates a hydrogen rich exhaust stream using reforming reactions that occur within the fuel cell stack and/or in a reformer in thermal integration with the fuel cell stack. The amount of hydrogen produced can be controlled by the operator. The hydrogen rich stream is further conditioned if necessary and stored or used directly by the operator. Thus, the high temperature electrochemical systems produce purified hydrogen as a by-product of fuel reformation in the fuel cell mode. The electrochemical system may operate in the fuel cell mode, when no external electricity input is required, to generate diffusion of ions across an electrolyte of the system. In contrast, a reversible or regenerative electrochemical system operates in the electrolysis mode when external electricity is required to generate diffusion of ions across the electrolyte of the system.

It should be noted that the electrochemical system of the first embodiment does not necessarily co-produce or co-generate power or electricity for use outside the system. The system may be operated to primarily internally reform a carbon and hydrogen containing fuel into hydrogen with minimal power generation or without delivering or outputting power from the system at all. If desired, a small amount of power may be generated and used internally within the system, such as to keep the system at operating temperature and to power system components in addition to other parasitic loads in the system.

In a preferred aspect of the first embodiment of the present invention, the high temperature electrochemical system is a SOFC or a SORFC system which co-produces electricity and hydrogen in the fuel cell mode. A SOFC or SORFC system operates in the fuel cell mode when oxygen ions diffuse through an electrolyte of the fuel cells from the oxidizer side to the fuel side of the fuel cell containing the carbon and hydrogen containing gas stream. Thus, when the high temperature electrochemical system, such as a SOFC or SORFC system operates in the fuel cell mode to generate hydrogen, a separate electrolyzer unit operating in electrolysis mode and which is operatively connected to the fuel cell stack is not required for generation of hydrogen. Instead, the hydrogen is separated directly from the fuel cell stack fuel side exhaust gas stream without using additional electricity to operate a separate electrolyzer unit.

When an SORFC system is used rather than an SOFC system, the SORFC system can be connected to a primary source of electricity (e.g., grid power) and can accept electricity from the primary source when desirable or can deliver electricity to the primary source when desirable, such as based on the cost of fuel and/or electricity. Thus, when operating the SORFC system of the first preferred embodiment, the system operator does not have to sacrifice electricity production to produce hydrogen and vice versa.

Furthermore, in a preferred aspect of the first embodiment, a relative amount of hydrogen and electricity produced can be freely controlled. All or a portion of the hydrogen in the fuel side exhaust stream may be recirculated into the fuel inlet stream to provide control of the amount of electricity and hydrogen being co-produced in the system, as will be described in more detail below. The hydrogen product can be further conditioned, if necessary, and stored or used directly in a variety of applications, such as transportation, power generation, cooling, hydrogenation reactions, or semiconductor manufacture, either in a pressurized or a near ambient state.

FIG. 1 illustrates an SOFC or SORFC electricity generation system 100 according to the first preferred embodiment. The system derives power from the oxidation of a carbon and hydrogen containing fuel, such as a hydrocarbon fuel, such as methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation. Free hydrogen is carried in several of the system process flow streams. The carbon containing fuel is provided into the system from a fuel source, which may comprise a fuel inlet into the fuel cell stack, a fuel supply conduit and/or a fuel storage vessel.

The system 100 contains an oxidizer inlet conduit 105, which preferably contains an air or other oxidizer blower (schematically shown in FIG. 1), and fuel inlet 106 and outlet 109 conduits. The system also contains a stack of SOFCs or SORFCs 110, which have a fuel inlet 107 and a fuel outlet 108. The stack 110 preferably contains the fuel cells, separator plates, seals, gas conduits, heaters, thermal insulation, control electronics and various other suitable elements used in fuel cell stacks. If desired, the system may have an optional oxidizer exhaust or outlet 116. Alternatively, the oxidizer outlet may be omitted to allow all oxygen to diffuse from the oxidizer inlet conduit 105 through the fuel cell electrolyte. The oxidizer inlet conduit 105 may also be used as an oxygen outlet when a SORFC is operated in the electrolysis mode. Water may be recirculated into the fuel inlet 107 from the fuel outlet 108.

System 100 also contains a fuel reformer 111, which may be any suitable device which is capable of reforming a carbon and bound hydrogen containing fuel to form a carbon containing fuel and free hydrogen. For example, the fuel reformer 111 may be any suitable device which can reform a hydrocarbon gas into a gas mixture of free hydrogen and a carbon containing gas. For example, the fuel reformer 111 may reform a biogas, such as natural gas to form free hydrogen and carbon monoxide. The free hydrogen and carbon monoxide are then provided into the fuel inlet 107 of the fuel cell stack 110. If desired, some or all free hydrogen may also be separated from the carbon containing gas by an additional hydrogen separator prior to entry into the fuel cell stack 110 and provided to the hydrogen storage/use subsystem 115.

The fuel reformer 111 is preferably thermally integrated with the fuel cell stack 110. The term "thermally integrated" in this context means that the heat from the reaction in the fuel cell stack 110 drives the net endothermic fuel reformation in the fuel reformer 111.

The system 100 also contains at least one hydrogen separator 113. The hydrogen separator 113 may comprise any device which can separate some or all hydrogen from a hydrogen containing gas stream. Preferably, the hydrogen separator is a device which can separate a desired or variable amount of hydrogen from a hydrogen gas containing stream, depending on user requirements. Alternatively, the hydrogen separator 113 may comprise a device which separates all or substantially all hydrogen from a hydrogen containing gas stream.

The hydrogen separator 113 may comprise one or more polymeric proton exchange membranes, ceramic proton exchange membranes, polymeric gas separation membranes, adsorption-based gas separation columns (such as pressure swing adsorption units), and flow diverting devices such as valves. The suitable device may be selected based on the state point of the gas stream (composition, temperature, and pressure), the desired product purity, available volume that depends on the specific generator design, and economic factors.

The system 100 also contains an optional hydrogen conditioner 114. The hydrogen conditioner 114 may be any suitable device which can purify, dry, compress (i.e., a compressor), or otherwise change the state point of the hydrogen-rich gas stream provided from the hydrogen separator 113. If desired, the hydrogen conditioner 114 may be omitted.

The system 100 also contains a hydrogen storage/use subsystem 115. This subsystem 115 may comprise a hydrogen storage vessel, such as a hydrogen storage tank, a hydrogen dispenser, such as a conduit which provides hydrogen or a hydrogen-rich stream to a device which uses hydrogen, or a hydrogen using device. For example, the subsystem 115 may comprise a conduit leading to a hydrogen using device or the hydrogen using device itself, used in transportation, power generation, cooling, hydrogenation reactions, or semiconductor manufacture.

For example, the system 100 may be located in a chemical or a semiconductor plant to provide primary or secondary (i.e., backup) power for the plant as well as hydrogen for use in hydrogenation (i.e., passivation of semiconductor device) or other chemical reactions which require hydrogen that are carried out in the plant.

Alternatively, the subsystem 115 may also comprise another fuel cell, such as an SOFC or SORFC or any other fuel cell, which uses hydrogen as a fuel. Thus, the hydrogen from the system 100 is provided as fuel to one or more additional fuel cells 115. For example, the system 100 may be located in a stationary location, such as a building or an area outside or below a building and is used to provide power to the building. The additional fuel cells 115 may be located in vehicles located in a garage or a parking area adjacent to the stationary location. In this case, the carbon and hydrogen containing fuel is provided to the system 100 to generate electricity for the building and to generate hydrogen which is provided as fuel to the fuel cell 115 powered vehicles. The generated hydrogen may be stored temporarily in a storage vessel and then provided from the storage vessel to the vehicle fuel cells 115 on demand (analogous to a gas station) or the generated hydrogen may be provided directly from the system 100 to the vehicle fuel cells 115.

In one preferred aspect of the present invention, the hydrogen separator 113 is used to separate and route hydrogen from the fuel side exhaust stream only into the subsystem 115. In another preferred aspect of the present invention, the hydrogen separator 113 is used to separate hydrogen from the fuel side exhaust stream and to route all or a part of the hydrogen back into the fuel inlet 107 of the fuel cell stack 110 through conduit 112, to route all or part of the hydrogen to the subsystem 115 and/or to route the hydrogen out with the tail gas.

Alternatively, two different hydrogen separators may be used to route the hydrogen to the conduit 112 and to the subsystem 115. Thus, the fuel side exhaust is separated by a valve or another device to two different hydrogen separators. The first hydrogen separator separates hydrogen from the first part of the fuel side exhaust and routes the hydrogen to conduit 112 to be recirculated into the inlet 107. The second hydrogen separator separates hydrogen from the second part of the fuel side exhaust and routes the hydrogen to the subsystem 115. Thus, the amount of hydrogen provided to conduit 112 and to subsystem 115 may be varied by controlling the amount of fuel side exhaust provided into each hydrogen separator.

Alternatively, only one hydrogen separator 113 is used. A valve or another device separates the hydrogen output from the separator into conduit 112 and into subsystem 115. Thus, the valve or another such device determines the amount of hydrogen provided to conduit 112 and subsystem 115. In both cases the valve or similar device may be controlled by an operator or controlled automatically by a computer based on predetermined data or on input parameters.

If desired the system may also contain an optional fuel preprocessor subsystem which converts a biogas, such as natural gas, to methane, and supplies methane into the fuel cell. If desired, the preprocessor subsystem may be used instead of the reformer 111. In this case, internal reforming fuel cells are used, where the reformer is integrated into the fuel cells. If desired, the fuel reformer 111 may be used together with the fuel preprocessing subsystem, such that the output of the preprocessor subsystem is provided into the reformer.

If desired, the system 100 may also contain a water-gas shift reactor. The water-gas shift reactor may be any suitable device which converts at least a portion of the water exiting the fuel cell stack 110 fuel outlet 108 into free hydrogen. For example, the reactor may comprise a tube or conduit containing a catalyst which converts some or all of the carbon monoxide and water vapor in the tail gas exiting outlet 108 into carbon dioxide and hydrogen. The catalyst may be any suitable catalyst, such as a iron oxide or a chromium promoted iron oxide catalyst. The reactor is preferably located between the outlet 108 and the hydrogen separator 113 (i.e., downstream of the outlet 108 and upstream of the separator 113).

The system 100 may also contain an optional water supply. The water supply may be any suitable liquid water and/or water vapor supply device, such as a water conduit or storage tank. The water supply is located upstream of the fuel inlet 107 to provide water into the fuel inlet 107 in addition to the fuel being provided to the inlet from the reformer 111.

A preferred method of operating the system 100 will now be described. The system is preferably operated so that excess fuel is provided to the fuel cell stack 110. Any suitable carbon containing and hydrogen containing fuel is provided into the fuel cell stack. The fuel may comprise a fuel such as a hydrocarbon fuel, such as methane, natural gas which contains methane with hydrogen and other gases, propane or other biogas.

If desired, hydrogen and/or water vapor may be added to the hydrocarbon fuel. Alternatively, the fuel may comprise a mixture of a non-hydrocarbon carbon containing gas, such as carbon monoxide, carbon dioxide, oxygenated carbon containing gas such as methanol or other carbon containing gas with a hydrogen containing gas, such a water vapor or hydrogen gas, for example the mixture may comprise syngas derived from coal or natural gas reformation. The hydrogen and water vapor may be recycled from the fuel side exhaust gas stream or provided from hydrogen and water vapor conduits or storage vessels.

The reformation reactions occur within the fuel cell stack 110 and/or in the optional reformer 111 and result in the formation of free hydrogen in the fuel side exhaust gas stream. For example, if a hydrocarbon gas such as methane is used as a fuel, then the methane is reformed to form a mixture containing non-utilized hydrogen, carbon dioxide and water vapor in the fuel cell stack 110. If natural gas is used as a fuel, then the natural gas may be converted to methane in the preprocessing subsystem or it may be reformed directly to a non-hydrocarbon carbon containing gas such as carbon monoxide in the reformer 111.

Preferably, the fraction of hydrogen separated by the hydrogen separator 113 and the amount of total fuel provided to the fuel cell stack 110 for electricity and hydrogen production are variable and under the control of an operator operating a control unit of the system. An operator may be a human operator who controls the hydrogen separation and electricity production or a computer which automatically adjusts the amount of hydrogen separation and electricity production based on predetermined criteria, such as time, and/or based on received outside data or request, such as a cost of electricity, cost of fuel, demand for electricity by the power grid and/or demand for hydrogen by the subsystem 115. Controlling these parameters allows the operator to specify largely independently the amount of hydrogen produced and the amount of electricity generated. The outside data or request may be transmitted electronically to a computer system operator or visually or audibly to a human system operator.

In one extreme, when the user of the system needs electricity, but does not need additional hydrogen, then the operator can choose to have the hydrogen containing streams recirculated back into the fuel cell stack 110 by the separator 113 through conduit 112 while providing no hydrogen or a minimum amount of hydrogen to the subsystem 115.

In another extreme, when the user of the system needs hydrogen, but does not need any electricity generated, the operator can choose to have the fuel cell stack 110 act primarily to internally reform the carbon containing fuel into hydrogen with minimal power generation and/or minimal or no external power output/delivery from the system. A small amount of power may be generated to keep the system at operating temperature and to power the hydrogen separator 113 and conditioner 114, if necessary, in addition to other parasitic loads in the system. All or most of the hydrogen from the separator 113 is provided to the subsystem 115 rather than to the conduit 112. In this case, additional water from the water supply 144 is preferably added to the fuel.

In the continuum between the two extremes, varying amounts of hydrogen and electricity may be needed simultaneously. In this case, the operator can choose to divert varying amounts of the hydrogen enriched stream from the separator 113 to conduit 112 and subsystem 115 while simultaneously generating the desired amount of electricity. For example, if more hydrogen is recirculated back into the fuel cell stack 110 through conduit 112, then more electricity is generated but less hydrogen is available for use or storage in the subsystem 115. The trade off between the amount of electricity and hydrogen produced can vary based on the demand and the price of each.

The trade off between the amount of electricity and hydrogen generated may also be achieved using several other methods. In one method, the amount of fuel provided to the fuel cell stack 110 is kept constant, but the amount of current drawn from the stack 110 is varied. If the amount of current drawn is decreased, then the amount of hydrogen provided to the hydrogen separator 113 is increased, and vice versa. When less current is drawn, less oxygen diffuses through the electrolyte of the fuel cell. Since the reactions which produce free hydrogen (i.e., the steam-methane reforming reaction (if methane is used as a fuel) and the water-gas shift reaction) are substantially independent of the electrochemical reaction, the decreased amount of diffused oxygen generally does not substantially decrease the amount of free hydrogen provided in the fuel side exhaust gas stream.

In an alternative method, the amount of current drawn from the stack is kept constant, but the amount of fuel provided to the stack 110 is varied. If the amount of fuel provided to the stack 110 is increased, then the amount of hydrogen provided to the hydrogen separator 113 is increased, and vice versa.

In another alternative method, both the amount of current drawn and the amount of fuel provided into the fuel cell stack 110 are varied. The amount of hydrogen generated generally increases with decreasing amounts of drawn current and with increasing amounts of fuel provided into the fuel cell stack. The amount of hydrogen generated generally decreases with increasing amounts of drawn current and with decreasing amounts of fuel provided into the fuel cell stack.

Preferably, the system of the first preferred embodiment may be operated at any suitable fuel utilization rate. Thus, 0 to 100 percent of the fuel may be utilized for electricity production. Preferably, 50 to 80 percent of the fuel is utilized for electricity production and at least 10 percent, such as 20 to 50 percent, of the fuel is utilized for hydrogen production. For example, a 100 kWe SOFC system may be used to generate from about 70 to about 110 kWe of electricity and from about 45 to about 110 kg/day of high pressure hydrogen when 50 to 80 percent of the fuel is utilized for electricity production. The system of the first preferred embodiment may be used to produce hydrogen cost effectively. Thus, the method of the first preferred embodiment provides a reduction in the cost of hydrogen production.

In the second preferred embodiment, where additional fuel such as hydrogen is generated for use outside the system when the regenerative or reversible fuel cell operates in the electrolysis mode, the reversible fuel cell is cyclically operated in the fuel cell and electrolysis modes. Excess reactant product is provided to the reversible fuel cell operating in the electrolysis mode from outside the electrochemical system, in addition to or instead of the reactant product generated by the reversible fuel cell in the fuel cell mode. Fuel, such as hydrogen, is generated in the electrolysis mode over a predetermined number of operating cycles in excess of fuel required to operate the reversible fuel cell in the fuel cell mode. The excess fuel generated by the reversible fuel cell operating in the electrolysis mode is removed from the electrochemical system.

The excess fuel is preferably generated by at least one of the following methods. In the first method, the reversible fuel cell operates at a higher current level in the electrolysis mode than in the fuel cell mode over the predetermined number of cycles. In the second method, the reversible fuel cell is operated at a load lower than a peak load that the reversible fuel cell system is capable of providing at least during a portion of a time that the reversible fuel cell system operates in the fuel cell mode. In the third method, the reversible fuel cell operates for a longer duration in the electrolysis mode than in the fuel cell mode over the predetermined number of cycles. In the fourth method, the reversible fuel cell is electrically connected to a renewable energy source, such that an excess capacity of the renewable energy source is used to provide electrical energy to the reversible fuel cell operating in the electrolysis mode to generate the excess fuel.

Thus, in the second preferred embodiment, regenerative or reversible operation of fuel cells can be applied beyond mere energy storage to produce fuel for uses outside the fuel cell system. A reversible fuel cell is used to reversibly store electrical energy. When electrical energy is needed from the storage system, the fuel cell operates in a fuel cell or discharge mode. In this mode, fuel is oxidized in the fuel cell, electricity is generated, and part or all of the reactant product is stored, if desired. The system is then recharged in an electrolysis or charge mode. In this mode, the system is recharged by supplying electrical power to the fuel cell, electrolyzing the stored and/or supplied reactant product, thereby regenerating the fuel. The regenerated fuel and optionally the regenerated oxidant are stored and available for energy generation in the fuel cell mode. The system cyclically or alternatively switches operation between the fuel cell and electrolysis modes for any suitable number of cycles. If more electrical energy and reactant product than needed to regenerate the fuel is supplied to the reversible fuel cell over a predetermined number of operating cycles, then excess or additional fuel can be generated during the electrolysis mode during some or all of these cycles. In other words, more fuel is generated when the system operates in the electrolysis mode than the fuel needed to operate the system in the fuel cell mode. This excess fuel can be used outside the energy storage system.

Figure 2:
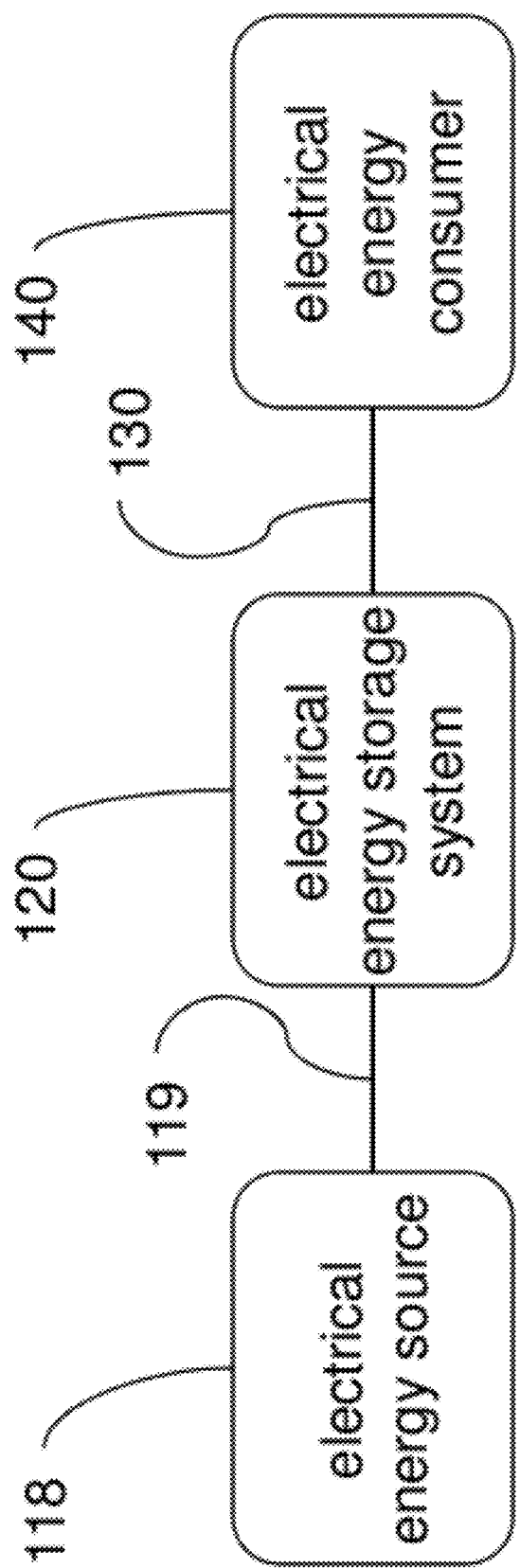
FIG. 2 is a schematic of an electrical energy storage system according to the first preferred embodiment of the present invention.

FIG. 2 shows an energy source 118 connected via a conduit 119 to an energy storage system 120. The energy storage system 120 is connected via conduit 130 to the energy consumer 140. The energy storage system 120 supplies the required power to the energy consumer 140 at all times or at predetermined times, if desired. The energy supplied to the consumer comes from the energy source 118, or from the energy storage system 120, or a combination of the two. The system shown in FIG. 2 decouples the amount of power drawn by the energy consumer 140 from the amount of energy drawn from the energy source 118.

Examples of the energy source 118 include, but are not limited to the electrical grid, electrical generators and renewable energy sources. Preferred renewable energy sources include photovoltaic sources, such as solar cell arrays, wind power sources, such as wind turbines, tidal power sources in which power is generated from forces of ocean, sea or lake tides, and geothermal power sources in which power is generated from geothermal heat.

The energy storage system 120 is preferably a reversible or regenerative fuel cell electrochemical system, as will be described in more detail below with respect to FIG. 3. Examples of the energy consumer 140 include, but are not limited to residential households, commercial building, such as factories, hospitals and office building, electrical subgrids, and remote transmitters.

The system 120 will draw more power from the energy source 118 than what is supplied to the energy consumer 140 in the electrolysis mode and the additional power is stored in the form of regenerated fuel. In the fuel cell mode the system 120 provides electrical power or energy to the consumer 140 instead of or in addition to the power provided to the consumer 140 from the energy source 118. As used herein, the terms "electrical power" and "electrical energy" refer to features of electricity provided by the energy source 118 and to features of electricity provided to the consumer 140.

Figure 3:
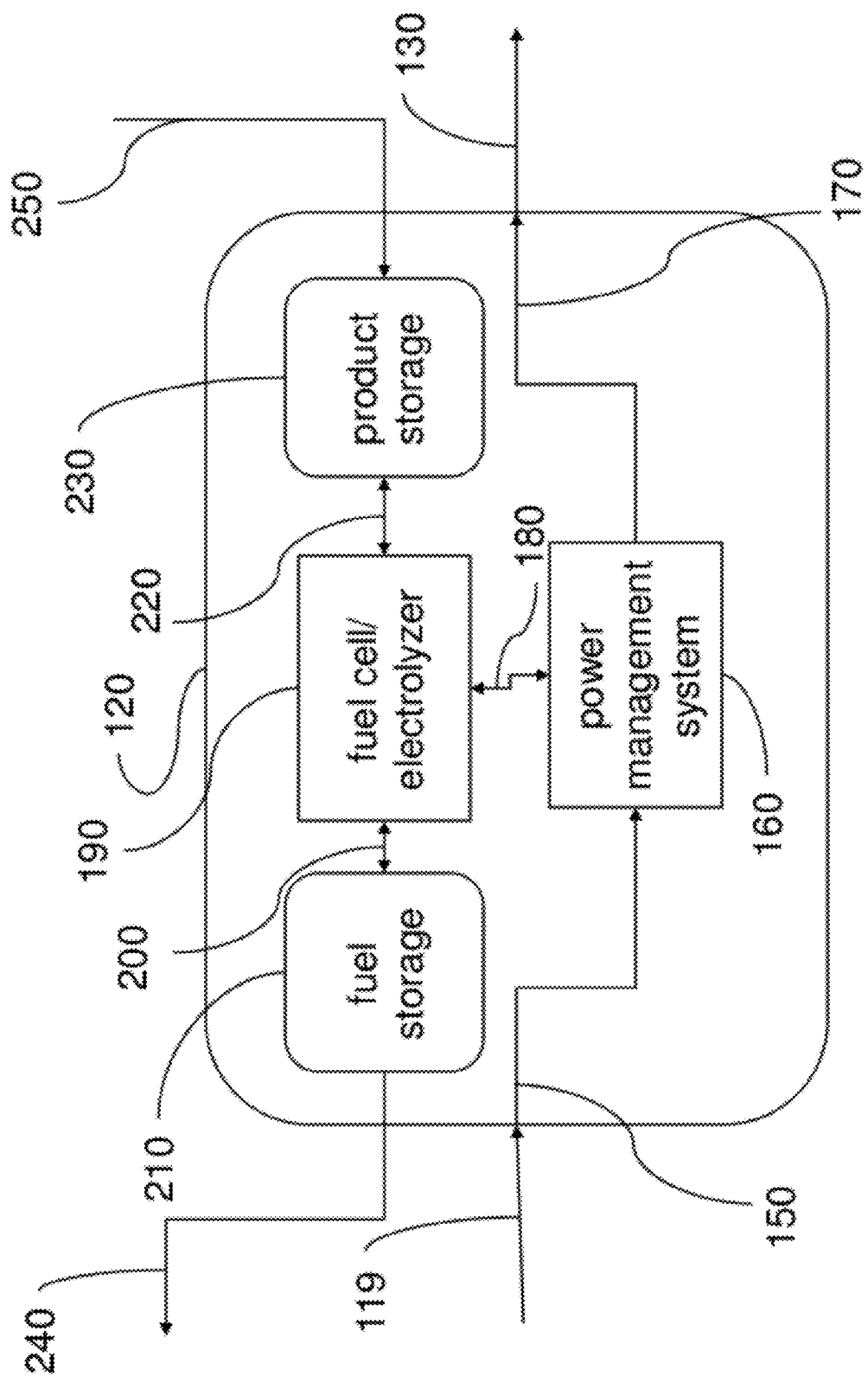
FIG. 3 is a schematic of an electrical energy storage system with a reversible fuel cell system, which can also generate fuel for use outside the electrical energy storage system.

FIG. 3 shows details of the energy storage system 120. The system 120 is preferably an electrochemical system which contains a power management system 160, a reversible fuel cell system 190, a fuel storage device 210 and an optional reactant product storage device 230. The system also contains electrical connection conduits or wires 150, 170 and 180, as well as a fuel conduit 200 and a reactant product conduit 220 which allow the fuel and reactant product to pass between the reversible fuel cell system 190 and the fuel storage 210 and product storage 230 devices, respectively.

The power management system 160 may be any suitable controller device, such as a computer or microprocessor, and preferably contains logic circuitry which decide how to route the power streams. Energy from the electrical energy source 118 can be directed fully to the electrical energy consumer 140, fully to the reversible fuel cell system 190, or can be partitioned between the electrical energy consumer 140 and the reversible fuel cell system 190. It is also possible to feed electrical energy back towards the electrical energy source 118, which can be applied for example where the electrical energy source 118 is the electrical grid. The power management system 160 also controls from where power is supplied to the electrical energy consumer 140. Power can be supplied from the electrical energy source 118, the reversible fuel cell system 190, or a combination thereof.

The reversible fuel cell system 190 may comprise one or more reversible fuel cells or one or more fuel cell/electrolyzer pairs. A reversible fuel cell is a single electrochemical device which generates reactant product and electrical energy or power in the fuel cell mode and which generates fuel from reactant product and electrical energy in the electrolysis mode. A fuel cell/electrolyzer pair includes two separate devices, where a non-reversible fuel cell device generates energy, and the other electrolyzer device regenerates fuel. Preferably, the system 190 contains at least one stack of reversible fuel cells or stacks of fuel cell/electrolyzer pairs. 7

The fuel and reactant product storage devices 210 and 230 may comprise any suitable gas, liquid or solid storage devices. Preferably, these devices 210, 230 comprise gas or liquid tanks which are opened and closed with a valve.

The system 120 operates as follows. Power from the electrical energy source 118 enters through conduit 119 and conduit 150 to the power management system 160. When the reversible fuel cell system 190 operates in the fuel cell mode and provides electrical energy, fuel is fed from the fuel storage device 210 to the reversible fuel cell system 190 via the fuel conduit 200. In the reversible fuel cell system 190, the chemical energy of the fuel is converted to electrical energy, which is then supplied to the power management system 160. Optionally, all or part of the reactant product from the reversible fuel cell system are transferred to the product storage device 230 via the reactant product conduit 220. Products that are not stored are released.

When the reversible fuel cell system 190 operates in the electrolysis mode, electrical energy from the power management system 160 is provided to system 190 and the reactant product from the product storage device 230 and/or from outside the electrochemical energy storage system 120 is provided via the reactant product conduit 220 to the system 190. The fuel is regenerated in the reversible fuel cell system 190 and provided to the fuel storage 210 via the fuel conduit 200.

Any suitable fuels, oxidizers and reactant product may be used. One preferred example for the fuel is hydrogen which is reacted with oxygen from ambient air to produce a water reactant product. However, other fuels and oxidants can be used. For example, a hydrocarbon gas, such as methane, may be used as a fuel to produce water and carbon dioxide reactant product. Other hydrocarbon gases, such as natural gas, propane, hexane, etc., may also be used as fuel. Furthermore, these hydrocarbon materials may be reformed into a carbon containing fuel, such as carbon monoxide, or previously supplied carbon monoxide may also be used as fuel.

If surplus energy is available from the electrical energy source 118 and an excess reactant product is supplied to the reversible fuel cell system 190, then the system 190 can generate more fuel than what is needed by the system 190 in the fuel cell mode. This excess fuel may be removed from the system 120 and provided for any suitable end use outside the system 120.

FIG. 3 also illustrates the fuel removal device 240 and the reactant product delivery device 250. Excess fuel is provided out of the system 120 through the fuel removal device 240, while the excess reactant product is replenished through reactant product delivery device 250. The devices 240 and 250 may comprise any suitable devices which may deliver fuel and reactant product.

For example, the fuel removal device 240 may be a gas or liquid conduit such as a pipe or hose which delivers fuel, such as hydrogen or methane, from the reversible fuel cell system 190 and/or from the fuel storage device 210 outside the system 120. Alternatively, the device 240 may comprise a movable gas or liquid storage container, such as a gas or liquid tank, which is physically removed from the system 120 after the container is filled with fuel. If the device 240 comprises a container, then the device 240 may be used as both the fuel storage device 210 while it remains in the system 120, and as a fuel removal device 240, when it is removed from the system 120.

The reactant product delivery device 250 may be one or more gas or liquid conduits which deliver reactant product, such as water and/or carbon dioxide to the system 120. For example, the device may comprise a water pipe or hose which delivers water to the product storage device 230 or directly to the reversible fuel cell system 190. The device 250 may comprise two conduits when the reactant product comprises two separate components, such as water and carbon dioxide. Alternatively, the device 250 may comprise a movable gas or liquid storage container, such as a gas or liquid tank, which is physically delivered to the system 120 filled with reactant product. If the device 250 comprises a container, then the device 250 may be used as both the reactant product storage device 230 while it collects reactant product during the fuel cell mode, and as a reactant product delivery device 250 when it provides reactant products during the electrolysis mode.

The reactant product delivery device 250 is adapted to supply excess reactant product to the reversible fuel cell system 190 operating in the electrolysis mode, in addition to or instead of the reactant product generated by the reversible fuel cell system in the fuel cell mode. In other words, the device 250 supplies the reactant product 250 in excess of the amount generated by the reversible fuel cell system 190 operating in the fuel cell mode. In one example, if the reactant product is water, then the water generated by the system 190 in the fuel cell mode is stored in the storage device 230 and the device 250 provides additional water to the device 230. In another example, the water generated by the system 190 in the fuel cell mode is discarded and the 250 provides water to the device 230 and/or to the system 190 in excess of the amount produced by the system 190 in the fuel cell mode.

In either example, the excess reactant product allows the system 190 to generate an amount of fuel in the electrolysis mode in excess of the amount of fuel required to operate the system 190 in the fuel cell mode over a predetermined number of operating cycles. Thus, while anomalies, such as breakdowns, early shut downs, etc., may occur during individual fuel cell mode and electrolysis mode cycles, when the system 190 is operated cyclically over a predetermined number of such cycles, such as over 10 cycles, for example over 100 to 1,000 cycles, the system 190 produces the excess fuel.

The reversible fuel cell system 190 may generate more fuel in the electrolysis mode than it consumes in the fuel cell mode over the predetermined number of cycles under several conditions. In a first aspect of the second embodiment of the present invention, the reversible fuel cell system operates at a higher current level in the electrolysis mode than in the fuel cell mode over the predetermined number of cycles. As a result of the higher current density in the electrolysis than in fuel cell mode, the energy storage system 120 typically has additional/unused fuel regeneration capacity. If additional or excess power or electrical energy and reactant product is available during fuel regeneration in the electrolysis mode, this excess fuel generation capacity can be utilized to generate additional fuel, which can be used outside the electrical energy storage system.

In a second preferred aspect of the second embodiment, the system 120 may be used as a regenerative power supply to remote residences or commercial operations or to residences or commercial operations connected to the power grid. The electrical power generator has to be sized to meet the peak load of the user. This sizing requirement allows a surplus of fuel to be generated during charge times. Examples include, but are not limited to systems sized to meet high electrical power peak demands which occur during less than 100 percent of the system operation in the fuel cell mode or systems with relatively low energy consumption (i.e., below the maximum possible energy consumption) during the fuel cell mode.

Thus, the reversible fuel system 190 is operated at a load lower than a peak load that the reversible fuel cell system is capable of providing at least during a portion of a time that the reversible fuel cell system operates in the fuel cell mode. Thus, the reversible fuel system 190 is operated for at least a portion of its fuel cell mode at a current density below its peak or maximum possible current density. In contrast, the reversible fuel system 190 is operated at a higher current density, such as at a peak current density, in the electrolysis mode to produce the excess fuel.

Since the systems 120, 190 are designed and sized for a desired energy storage, the size of the fuel cell stack and the size of the balance of plant are based on the desired energy storage. Thus, the size of the fuel cell stack is based on the minimum number of fuel cells that operate in the fuel cell mode to provide the desired peak power, rather than on the number of fuel cells or electrolyzers that are required for the electrolysis mode. Thus, extra fuel cells or stacks may be required ensure that the system 120 provides the desired peak power in the fuel cell mode during a worst case scenario. However, the energy generation capability of all of the fuel cells may not be used in the fuel cell mode outside of the worst case scenario. In contrast, the fuel regeneration capability of all fuel cells may be used during electrolysis mode to regenerate the fuel needed for future fuel cell mode(s) and to generate excess fuel for use outside the system 120.

In another exemplary aspect of the second embodiment, the reversible fuel cell system 190 is electrically connected to an electrical energy source 118 which comprises a photovoltaic energy generation system which provides electrical energy to the reversible fuel cell system during daytime to generate and store fuel. The photovoltaic energy generation system also provides electrical energy to the consumer 140, as illustrated in FIG. 3. The reversible fuel cell system 190 generates electrical energy during night time from the stored fuel and provides this electrical energy to the consumer 140 during night time. Often, the night time load on the reversible fuel cell system 190 is lower than a peak load that the reversible fuel cell system is capable of providing, at least during a portion of the night time period. Thus, the reversible fuel system 190 is operated in the fuel cell mode during at least a portion of the night time period at a current density below its peak current density. In contrast, the reversible fuel system 190 is operated at a higher current density, such as at a peak current density, in the electrolysis mode during the day time period to produce the excess fuel.

In a third aspect of the second embodiment, the reversible fuel cell system 190 operates for a longer duration in the electrolysis mode than in the fuel cell mode over the predetermined number of cycles. This difference in operating time may be used to produce the excess fuel. For example, the system 190 may operate during one portion of the electrolysis mode to regenerate sufficient fuel for the entire next fuel cell mode period, and then operate for the remainder of the electrolysis mode period to produce the excess fuel.

Examples of the third aspect of the second embodiment include system 190 operation where charging and discharging follows a day/night cycle. Such a system often operates with a photovoltaic electrical energy source 118 described above. If the night time discharge period is shorter than the day time charge period, a surplus or excess fuel can be generated.

Another example is where the system 190 is used to provide emergency backup power when the electrical energy source 118 is unable to provide electrical energy to the consumer 140. For example, the system 190 may be used as a backup power source for a time when an electrical grid energy source 118 stops providing electrical energy. In this example, the system 190 operates at least 90 to 99 percent of the time in the electrolysis mode and occasionally operates in the fuel cell mode when the source 118 does not provide electrical energy. Thus, the system 190 is used as an electrolyzer which provides fuel for non-system uses and as an emergency backup power generator. This mode of operation reduces the cost of the emergency backup energy generation system.

If desired, the first, second and third aspects may be combined, and the system 190 may operate in the electrolysis mode for a longer time period and at a higher current density than in the fuel cell mode.

In a fourth aspect of the third preferred embodiment, the reversible fuel cell system 190 is electrically connected an electrical energy source 118 which comprises a renewable energy source. Any suitable renewable energy source may be used. An excess capacity of the renewable energy source is used to provide electrical energy to the reversible fuel cell operating in the electrolysis mode to generate the excess fuel. Different renewable energy sources have different types of excess capacities.

In one example, the renewable energy source 118 may comprise a photovoltaic system, such as a solar cell array. The photovoltaic system contains extra capacity during a first portion, such as the first 95 to 99.9 percent, of its designed lifespan. In other words, the capacity of the photovoltaic system decreases as the system ages during its life span. Thus, a photovoltaic system is often designed to provide a desired amount of electrical energy based on the remaining second portion of its expected lifespan, to prevent the photovoltaic system from providing an insufficient amount of electrical energy in the second portion of its expected life span. Therefore, the photovoltaic system is designed and sized to provide electrical energy in excess of that required by the consumer and that required by the reversible fuel cell system 190 to regenerate fuel for operation in the fuel cell mode. The excess capacity of the photovoltaic system during the first portion, such as the 95 to 99.9 percent, of its life span may be used to provide electrical energy to the reversible fuel cell system 190 to generate the excess fuel.

In another example, the photovoltaic system 118 is designed and sized to provide a sufficient amount of electrical energy required by the consumer and required by the reversible fuel cell system 190 to regenerate fuel for operation in the fuel cell mode over a predetermined number of day and night cycles, even if a large amount of days are cloudy. In other words, the photovoltaic system 118 is designed to provide a sufficient amount of electrical energy in a worst case weather scenario, such as when a predetermined percent, X, of day time periods are cloudy. However, the worst case weather scenario occurs occasionally. Thus, when less than X percent of day time periods are cloudy, and the system 190 is fully recharged for operation in the next fuel cell mode period or periods, the photovoltaic system 118 may be used to provide electrical energy to system 190 to generate excess fuel during the excess sunny portions of the day time periods.

In another example, the renewable energy source 118 may comprise a wind turbine system which is designed to provide a minimum amount of electrical energy at a predetermined wind speed. Such systems often contain rotatable blades coupled to a generator which generates electricity when the wind rotates the blades. This system 118 contains extra capacity during periods when the wind speed exceeds a predetermined wind speed.

In another example, the renewable energy source 118 may comprise a tidal energy generation system which is designed to provide a minimum amount of electrical energy at a predetermined tidal force. Such a system 118 contains movable members, such as plates, located under a body of water, such as a sea, ocean or lake. The movable members are connected to a generator. The movable members are moved by the tides and the movement causes the generator to generate electricity. This system contains extra capacity during periods when the tidal force exceeds the predetermined tidal force.

In another example, the renewable energy source 118 may comprise a geothermal energy generation system which is designed to provide a minimum amount of electrical energy at a predetermined geothermal energy. Such a system 118 uses the heat and/or steam emitted from the earth and converts the heat and/or steam into electrical energy. This system contains extra capacity during periods when the geothermal energy exceeds a predetermined, worst case thermal energy supply scenario. For example, ambient losses for the geothermal energy differ between warm summer ambient temperatures and cold winter ambient temperatures.

Thus, as described above, co-production of fuel in an energy storage device using a fuel regenerating device can be realized in any situation where the fuel consumed during discharge is less than the fuel regenerated during charging periods, preferably over a predetermined number of charge and discharge cycles. The system 190 generates fuel during the entire electrolysis mode time period. From about 1 to about 99 percent of the generated fuel, such as about 10 to about 30 percent of the generated fuel is excess fuel which may be used for non-system 120 uses, while the remaining fuel may be used to operate the system 190 in the fuel cell mode.

If desired, the equilibrium operating temperature of the reversible fuel cell system 190, such as a fuel cell stack, in the electrolysis mode is selected independently from the equilibrium operating temperature of the fuel cell stack in the fuel cell mode to optimize the amount and/or cost of the fuel produced in the electrolysis mode. Thus, in this embodiment, the equilibrium operating temperature of the fuel cell stack in the electrolysis mode is preferably, but not necessarily different from the equilibrium operating temperature of the fuel cell stack in the fuel cell mode.

In one preferred aspect, the equilibrium operating temperature of the fuel cell stack in the electrolysis mode may be selected to optimize or maximize the amount of fuel produced. In another preferred aspect, the equilibrium operating temperature of the fuel cell stack in the electrolysis mode may be selected to optimize or minimize the unit cost of the fuel produced and/or to adjust the operating efficiency of the fuel cell stack based on the cost of electricity and/or fuel. In this aspect, in certain situations, depending on different fuel cell stack design and operating variables, one or more minima may be observed on a curve of unit fuel and/or electricity cost versus amount of fuel produced. The equilibrium operating temperature of the fuel cell stack in the electrolysis mode may be optimized to operate at or near one of the minima on this curve. In another preferred aspect, the equilibrium operating temperature of the fuel cell stack in the electrolysis mode is selected to maximize the amount of fuel produced during some time periods, such as during periods of high fuel demand or price, and at other time periods it is selected to minimize the fuel unit cost, such as during periods of low fuel price or demand and/or during periods of high cost of electricity. Thus, the equilibrium operating temperature of the fuel cell stack in the electrolysis mode may be higher or lower than that in the fuel cell mode depending on the desired optimized condition, such as fuel amount or fuel unit cost.

Preferably, the equilibrium operating temperature of the fuel cell stack in the electrolysis mode is obtained by adjusting the current density provided to the fuel cell stack for a given reactant product flow rate. For example, the power management system 160 may be used to control the current density provided to the fuel cell stack (i.e., the reversible fuel cell system 190). As discussed above, the system 160 may be any suitable control system, such as a computer or microprocessor. Alternatively, the system 160 may comprise a manual current density control system, such as a manually rotated knob, lever, dial or one or more push buttons.

Alternatively, the equilibrium operating temperature of the fuel cell stack may be adjusted by other methods. For example, the current density may be held constant while the reactant product flow rate may be adjusted manually or automatically by a controller, such as by a manual or automatic valve. If desired, both the current density and the reactant product flow rate may be adjusted to select the desired temperature.

Figure 4:
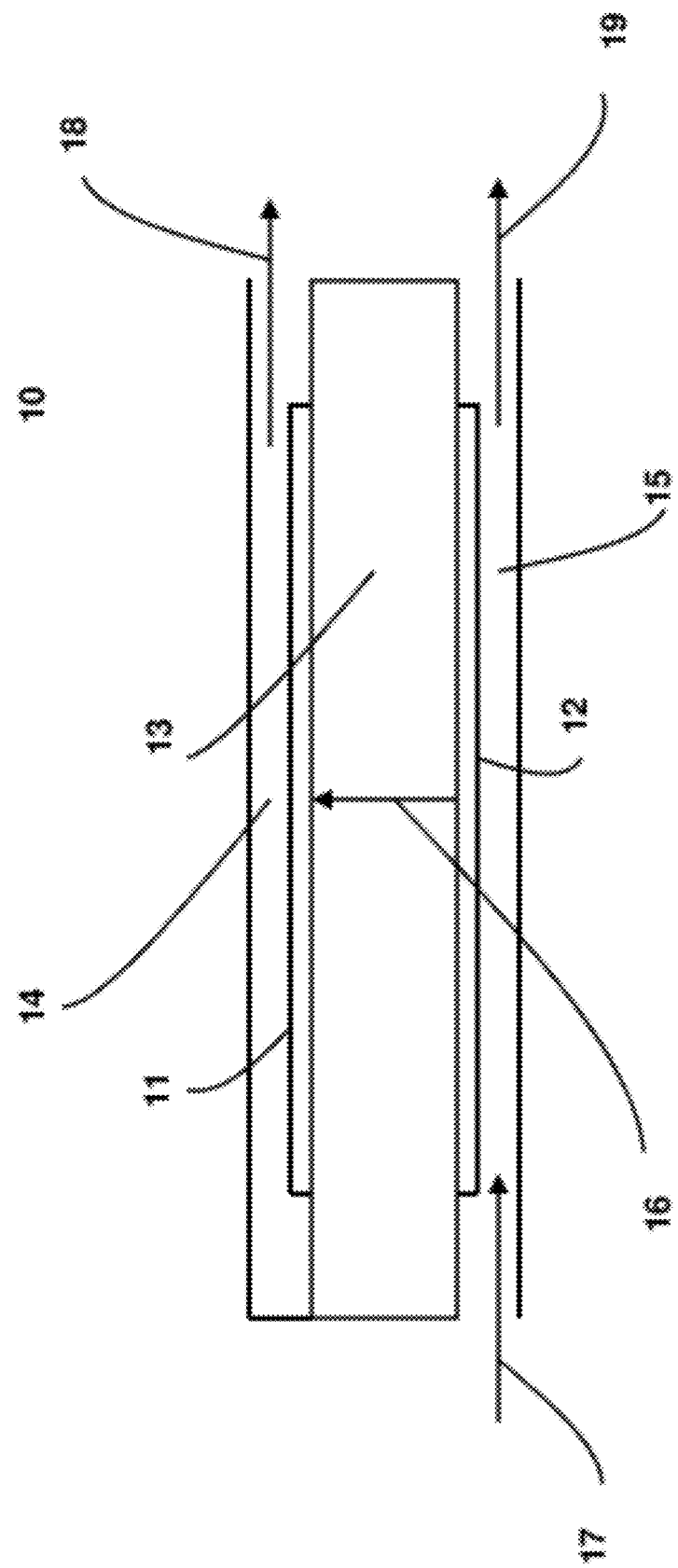
FIG. 4 is a schematic cross section of a single SORFC operating in the electrolysis mode according to an embodiment of the present invention.

As discussed above, a SOFC or SORFC is the preferred fuel cell of the first and second embodiments. A single SORFC 10 operating in the electrolysis mode is shown in FIG. 4. The SORFC contains an anode electrode 11, an electrolyte 13 and a cathode electrode 12. An anode gas chamber 14 is formed between the electrolyte 13 and an anode side interconnect (not shown for simplicity). A cathode gas chamber 15 is formed between the electrolyte 13 and a cathode side interconnect (also not shown for simplicity).

A reaction product gas mixture 17 may contain primarily water if hydrogen is used as a fuel. Alternatively, the reaction product gas mixture 17 may contain primarily water vapor and carbon dioxide if a carbon containing gas or liquid is used as a fuel. The reaction product gas mixture 17 is introduced into the cathode gas chamber 15. A direct current power source (not shown) is connected to the anode electrode 11 and the cathode electrode 12 in such a way that when electrical current is flowing, the anode electrode 11 takes on a positive voltage charge and the cathode electrode 12 takes on a negative voltage charge. When the electric current is flowing, the gas mixture 17 gives up oxygen ions 16 to form cathode discharge mixture 19 consisting primarily of hydrogen and optionally carbon monoxide if mixture 17 contained carbon dioxide. Oxygen ions 16 transport across the electrolyte 13 under the electrical current. The oxygen ions 16 are converted into the oxidant, such as oxygen gas 18 on the anode electrode 11 under the influence of the electrical current. The oxygen gas 18 is discharged from the anode chamber 14, while the electrolysis product (e.g., hydrogen and optionally carbon monoxide) is collected from the cathode chamber.

Figure 5:
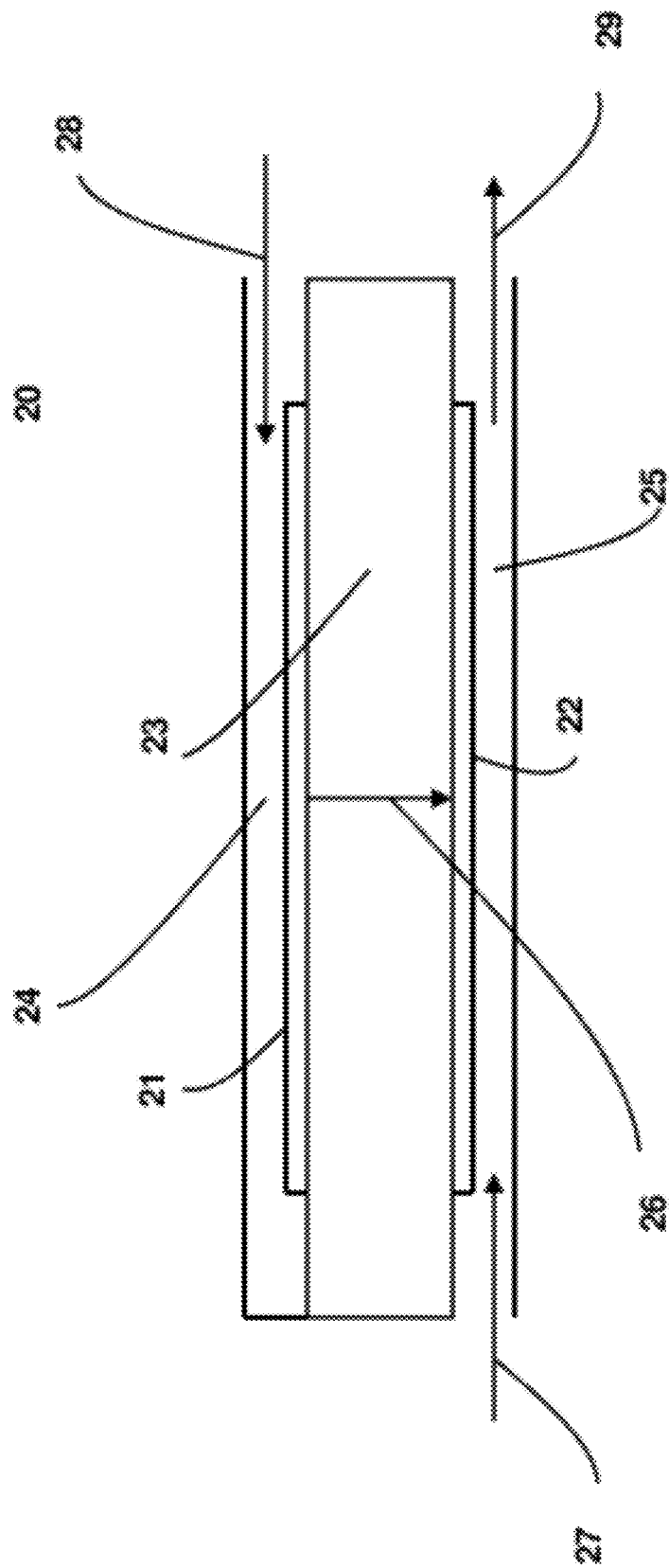
FIG. 5 is a schematic cross section of a single SORFC operating in the fuel cell mode according to an embodiment of the present invention.

A single SORFC 20 operating in the fuel cell mode is shown in FIG. 5. SORFC 20 is the same as SORFC 10, except that the cathode and anode designations of its electrodes are reversed. Cathode electrode 21 is the same electrode as that identified as the anode electrode 11 in FIG. 4 when operating in the electrolysis mode. Anode electrode 22 is the same electrode as that identified as the cathode electrode 12 in FIG. 4 when operating in the electrolysis mode. Solid oxide electrolyte 23 is the same electrolyte as that identified as electrolyte 13 in FIG. 4 when operating in the electrolysis mode. Cathode gas chamber 24 is the same gas chamber as that identified as the anode gas chamber 14 in FIG. 4 when operating in the electrolysis mode. Anode gas chamber 25 is the same gas chamber as that identified as the cathode gas chamber 15 in FIG. 4 when operating in the electrolysis mode.

A fuel gas 27 is introduced into the anode gas chamber 25. Oxygen gas 28 is introduced into the cathode chamber 24. The fuel may comprise hydrogen, a hydrocarbon gas, such as methane, and/or carbon monoxide. Water may be added to the fuel if desired. An electrical fuel cell load (not shown) is applied to the SORFC 20 and the oxygen gas 28 forms oxygen ions 26 under the influence of the electrical load. Oxygen ions 26 transport across the electrolyte 23 under the influence of the electrical current. On the anode electrode 22, the oxygen ions 26 combine with hydrogen and optionally carbon, if present, from gas mixture 27 to form gas mixture 29 containing water vapor and optionally carbon dioxide, if a carbon containing gas is present in the fuel 27. Gas mixture 29 is discharged from the anode chamber and stored as the reaction product. In the process described above, the SORFC 20 has made electrical energy or power, which is output through its electrodes.

Figure 6:
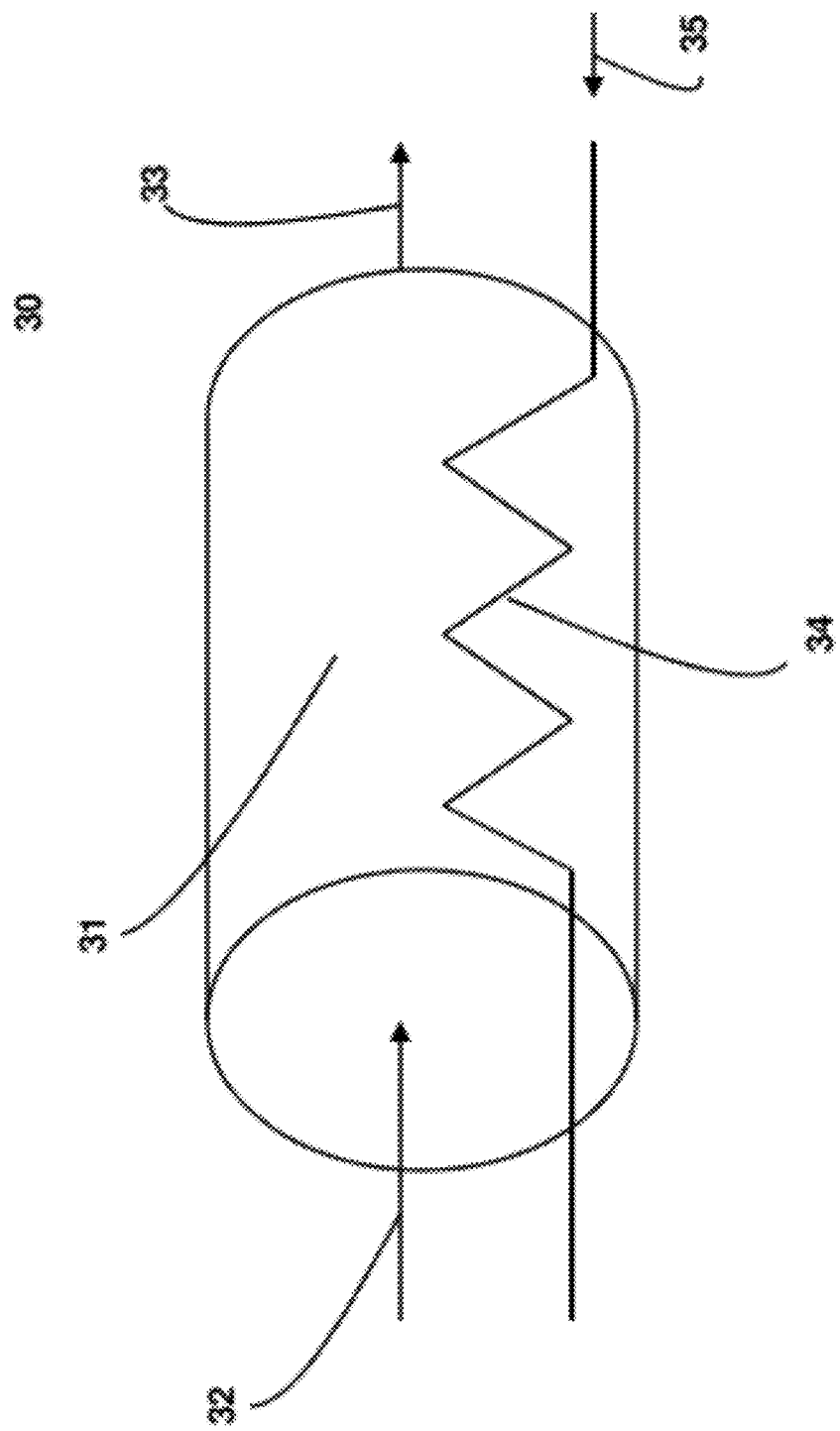
FIG. 6 is a schematic side of view of a Sabatier reactor according to an embodiment of the present invention.

An optional Sabatier reactor subsystem 30 to be used when the fuel comprises methane is shown in FIG. 6. The reactor tube 31 contains a catalyst, such as a platinum family metal on an alumina support. Preferably, the catalyst comprises ruthenium. A gas mixture 32 consisting primarily of hydrogen and carbon monoxide is introduced into reactor tube 31 and contacts the catalyst therein. The gas mixture 32 undergoes an immediate exothermic reaction and produces gas mixture 33 consisting primarily of methane and water vapor. Gas mixture 33 is then discharged from the reactor tube 31. When the Sabatier reactor is used with the SORFC 10 operating in the electrolysis mode, the hydrogen and carbon monoxide discharge mixture 19/32 is provided from the SORFC into the Sabatier reactor 30.

Because the reaction within reactor tube 31 is highly exothermic, a heat exchanger 34 located in or adjacent to tube 31 is used to capture the generated heat. Gas mixture 35, consisting primarily of carbon dioxide and water, flows through heat exchanger 34 to absorb the exothermic reaction heat. When the Sabatier reactor is used with the SORFC 10 operating in the electrolysis mode, the water vapor and carbon dioxide inlet mixture 17/35 is heated in the Sabatier reactor by the reaction of the outlet or discharge mixture 19/32. The water vapor and carbon dioxide inlet mixture 17/35 is then provided from the Sabatier reactor into the SORFC 10.

Figure 7:
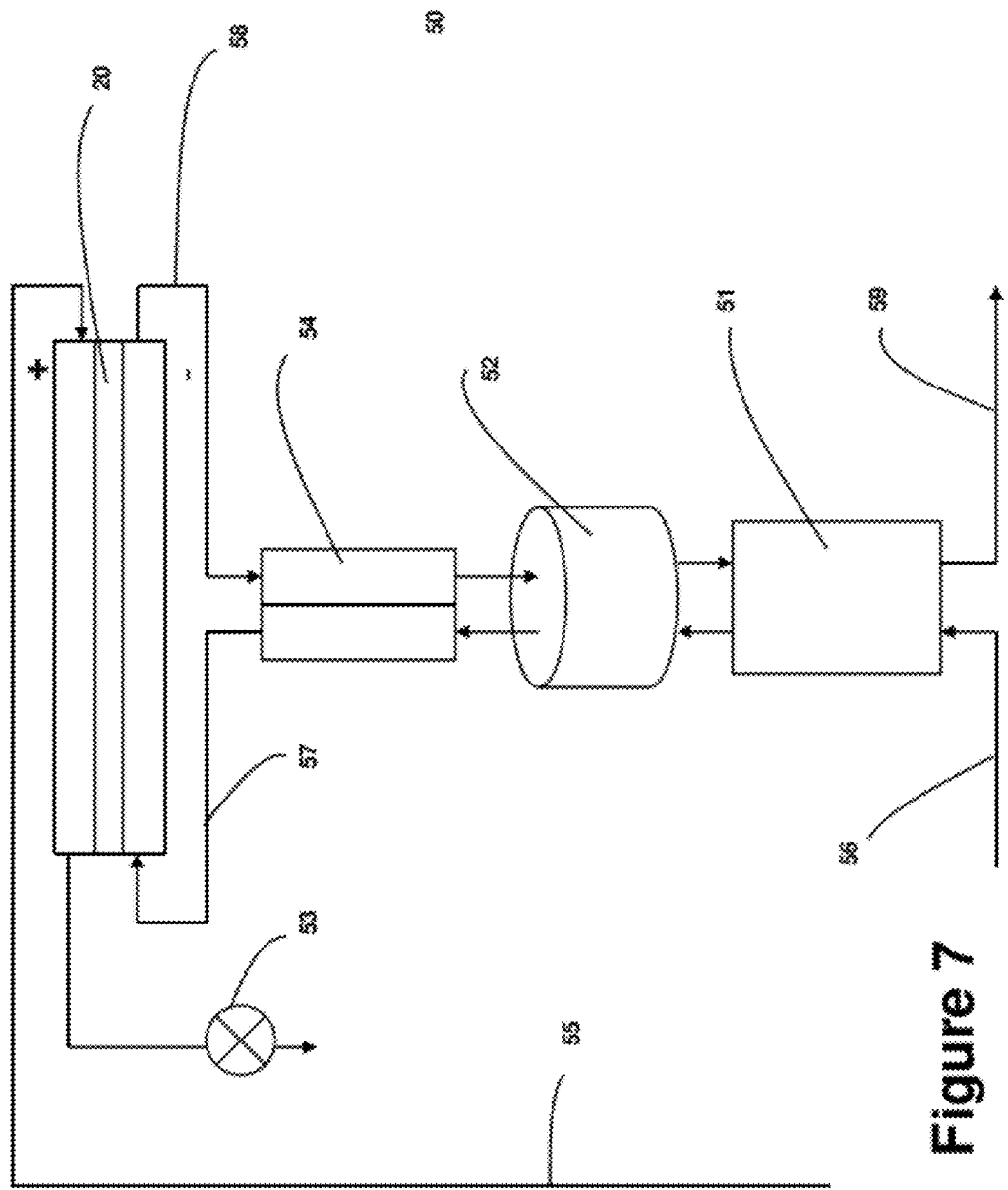
FIG. 7 is a system schematic of the major SORFC components operating in the fuel cell mode, according to an embodiment of the present invention.

The SORFC system 50 of a preferred embodiment operating in a fuel cell mode is shown of FIG. 7 as a simplified schematic. The system 50 as shown operates with methane as a fuel. However, if desired, a hydrogen fuel may be used instead, as discussed above. A single SORFC 20 previously shown in FIG. 5 as a cross section operating in the fuel cell mode is shown again in FIG. 7. While a single SORFC is shown, it should be understood that the system 50 contains a plurality of SORFC stacks. A hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

An enthalpy recovery unit 52 transfers water vapor from first gas stream to a second gas stream. The enthalpy recovery unit 52 can be a device which transfers water vapor based on cyclic desiccant beds or a rotating desiccant wheel. The desiccant wheel (i.e., "enthalpy wheel") is preferred. An optional purge valve 53, such as a normally closed powered open solenoid valve may be used if pure oxygen is used. A heat exchanger 54 is a counter flow gas-gas heat exchanger. The SORFC power output, such as output electrode(s), is connected to a power distribution system. The oxidizer (i.e., oxygen or air) enters the system 50 through the oxidizer inlet or conduit 55, while the fuel enters the system through the fuel inlet or conduit arrangement 56/57. The fuel exhaust exits through conduit arrangement 58/59.

A method of operating the system 50 in the fuel cell mode is now described. Within the SORFC system 50 shown in FIG. 7, oxidizer, such as pure oxygen reactant gas from an oxygen storage vessel, such as a liquid oxygen tank, or air, is delivered to the cathode chamber of SORFC 20 through inlet conduit 55. If oxygen reactant is highly pure, then it is normally dead headed within the cathode chamber of SORFC 20. However, even the purest of gases will include trace non reactant gas species. As a result the cathode chamber of SORFC 20 should be occasionally purged of these non reactant species. Oxygen purge valve 53 is used to accomplish this purging.

High purity hydrocarbon inlet stream, such as a methane stream, is introduced into the SORFC system 50 from a hydrocarbon storage vessel, such as a tank (not shown for clarity), through conduit 56 into the hydrogen recovery unit 51. As noted above, a hydrogen fuel inlet stream may be used instead. Within the hydrogen recovery unit 51, hydrogen gas is transferred from the fuel exhaust outlet stream in conduit 58 into the methane stream. This hydrogen supports a uniform methane reformation process within the anode chamber of SORFC 20. The methane and hydrogen mixture next is introduced into the enthalpy recovery unit 52, where a portion of the water vapor is transferred from the fuel exhaust outlet stream in conduit 58 into the methane and hydrogen inlet stream. Preferably, the enthalpy recovery unit also transfers heat from the outlet stream to the inlet stream. From the enthalpy recovery unit 52, the methane, hydrogen and water vapor mixture is introduced into the heat exchanger 54, where the gas mixture temperature is increased near to the operational temperature of 600 C to 1000 C using the high temperature waste heat from the outlet stream in conduit 58. From heat exchanger 54, the hot mixture of methane, hydrogen, and water vapor is delivered to the anode chamber of SORFC 20 through conduit 57. Some steam reformation of the methane will occur in the heat exchanger 54 and conduit 57 but the amount is suppressed by the existence of the hydrogen. The completion of the steam reforming of the methane is accomplished in the anode chamber of the SORFC 20.

Within the anode chamber of the SORFC 20, the steam reforming of methane and the oxidation of carbon and hydrogen in the fuel cell reactions converts the discharged gas mixture (i.e., fuel exhaust) in conduit 58 to carbon dioxide, additional water vapor, and excess hydrogen. If hydrogen rather than methane is used as a fuel, then no carbon dioxide is produced. The discharged gas mixture in conduit 58 passes through heat exchanger 54, releasing waste heat, and then through the enthalpy recovery unit 52 to supply a portion of the water vapor to support the input methane reformation. The discharged gas mixture in conduit 58 is then directed to the hydrogen recovery unit 51 where virtually all but trace quantities of the hydrogen is transferred to the inlet fuel stream. Using the preferred electrochemical proton exchange process as the hydrogen recovery unit 51, provides an exact measure of the hydrogen content within the discharged gas mixture in conduit 58 which is used to adjust the input methane flow rate. The outlet mixture in conduit 59 from hydrogen recovery unit 51 contains only carbon dioxide and water which are stored separately (not shown).

Figure 8:
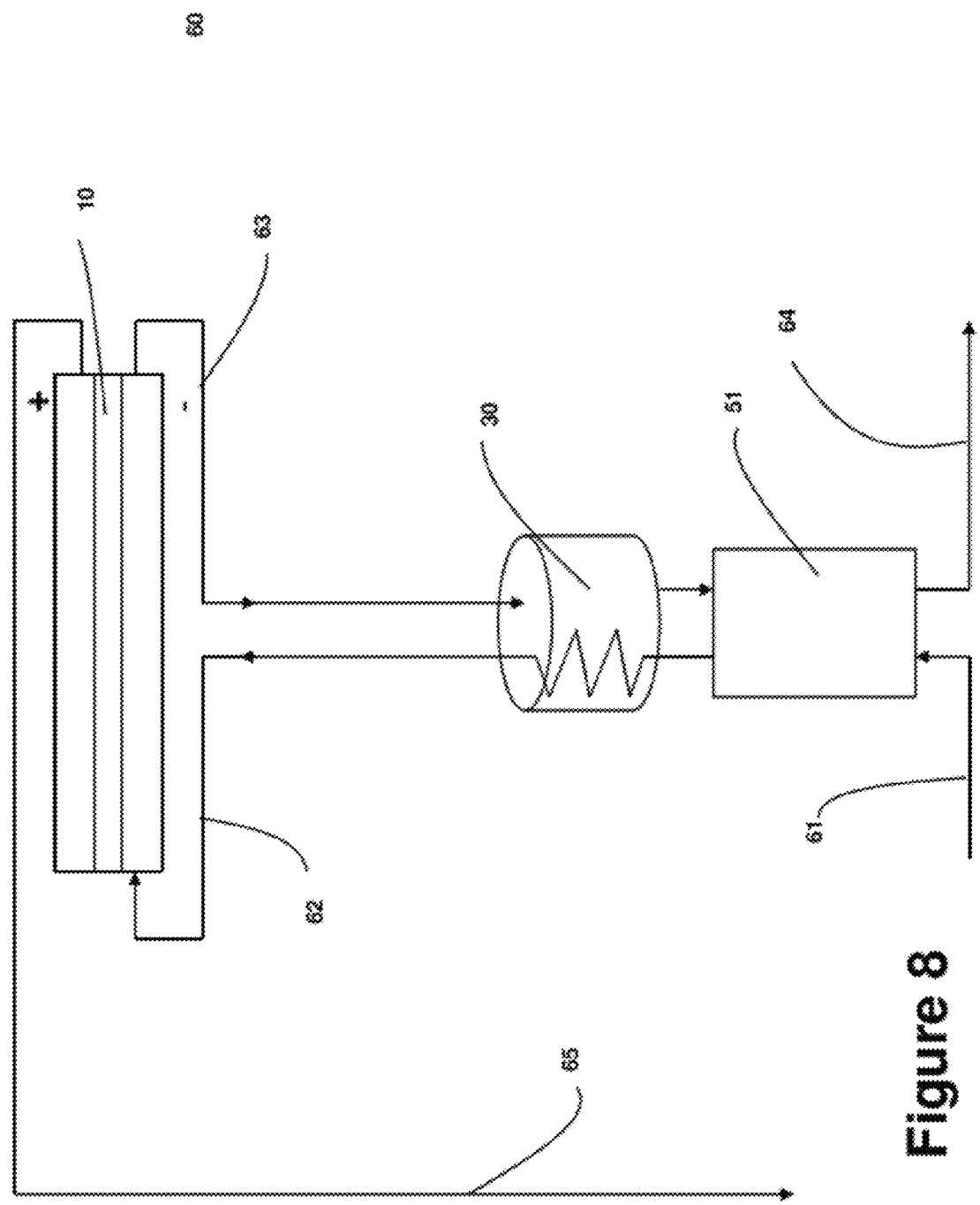
FIG. 8 is a system schematic of the major SORFC components operating in the electrolysis mode, according to an embodiment of the present invention.

The SORFC system 60 of a preferred embodiment operating in an electrolysis mode is shown of FIG. 8 as a simplified schematic. A single SORFC 10 previously shown in FIG. 4 as a cross section operating in the electrolysis mode is shown again in FIG. 8. The hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

If methane is used as a fuel, then the system 60 also includes the Sabatier reactor subsystem 30, described with respect to FIG. 6, which converts carbon monoxide and hydrogen into methane and water vapor. If methane is used as a fuel, then the reactant product comprising carbon dioxide and water enter the system 60 through inlet or conduit 61, which may be the same or different than conduit 56, shown in FIG. 7. If hydrogen is used as a fuel, then water is used as a reactant product. The generated oxygen exits through outlet or conduit 65, while the methane and water exit through outlet or conduit arrangement 63/64. Conduits 63/64 and 65, respectively, may be the same or different conduits as conduits 58/59 and 55, respectively, shown in FIG. 7.

Thus, the system 60 operating in the electrolysis mode is the same system as system 50 operating in the fuel cell mode, except that the inlet and outlet streams are steered through the optional Sabatier reactor subsystem 30 instead of through the heat exchanger 54 and the enthalpy recovery unit 52, which remains inactive in the electrolysis mode. The inlet and outlet streams may be steered using valves and parallel conduits (not shown for clarity). Furthermore, the electrode designations in the SORFC 10 of system 60 are reversed compared to SORFC 20 of system 50, as explained in detail with respect to FIGS. 1 and 2 above.

A method of operating the system 60 in the electrolysis mode is now described. If methane is used as a fuel, then carbon dioxide and water are introduced into the SORFC system 60 through conduit 61 into hydrogen recovery unit 51. Carbon dioxide may be introduced from a carbon dioxide storage vessel or from a conduit. If hydrogen is used as a fuel, then the carbon dioxide is omitted. Within the hydrogen recovery unit 51, hydrogen gas is transferred from the outlet stream in conduit 63 into the carbon dioxide and water inlet stream. This extra hydrogen eventually assures that all the carbon bearing gases are converted into methane within the Sabatier reactor subsystem 30. The carbon dioxide, water, and hydrogen inlet mixture next is introduced into the Sabatier subsystem 30 heat exchanger where it is heated by the exothermic reaction. From the Sabatier subsystem 30, the carbon dioxide, hydrogen and water vapor mixture is delivered to the cathode chamber of SORFC 10 through conduit 62. Within the cathode chamber of SORFC 10, the carbon dioxide and water vapor are reduced by electrolysis to carbon monoxide and hydrogen. Excess water and some unreacted carbon dioxide will be discharged from the cathode chamber of SORFC 10 along with the carbon monoxide and hydrogen through conduit 63.

The discharged gas mixture in conduit 63 passes through the Sabatier subsystem 30 to convert all the carbon oxides to methane and water with the excess hydrogen. If hydrogen is used as a fuel, then the Sabatier subsystem 30 is omitted and the discharged water vapor comprises the reactant product. The discharged gas mixture in conduit 63 is then directed to the hydrogen recovery unit 51 wherein virtually all but trace quantities of the hydrogen is transferred to the inlet carbon dioxide and water stream. Using the preferred electrochemical proton exchange process as the hydrogen recovery unit 51, provides an exact measure of the hydrogen content within the discharged gas mixture in conduit 63 which is used to adjust the input carbon dioxide flow rate. The outlet mixture in conduit 64 from hydrogen recovery unit 51 contains only methane and water which are stored separately (not shown). If desired, the water may be discharged and fresh water from a water pipe may be used for the SORFC reactions.

In the meantime, pure oxygen gas is generated in the SORFC 10 anode during the electrolysis process. The oxygen is discharged from the SORFC 10 anode through conduit 65 and on to discharge, direct metabolic use and/or to liquefied storage (not shown).

The Sabatier reactor which generates methane is advantageous because it operates at a temperature of about 400-900° C. degrees, which is a suitable temperature for heating the inlet stream being provided into the SORFC to or near to a desired SORFC operating temperature. However, other reactors which generate hydrocarbon gases other than methane may be used instead of the Sabatier reactor.

For example, reactors which convert an exhaust gas which contains hydrogen and carbon oxides, such as carbon monoxide and/or carbon dioxide, and optionally water, to methanol may be used instead. The methanol reactors typically, but not necessarily, contain a copper catalyst which converts hydrogen, carbon oxides and/or water vapor to methanol. These reactors may be catalyst bed type reactors, such as ARC reactors, quench converters, tube cooled converters, isothermal reactors where a continuous catalyst bed surrounds a spiral wound heat exchanger, and other suitable reactor types.

If desired, additional reactors may be present downstream of the Sabatier or methanol reactors to further purify the methane or methanol if desired. Alternatively, the additional reactors may be used to convert methane or methanol to other hydrocarbon gases, such as ethane, propane, octane, formic acid, formaldehyde and/or other suitable hydrocarbon gases. These hydrocarbon gases may be used as a fuel for the SORFC in the fuel cell mode and/or may be removed from the SORFC system for other use, sale or storage. Thus, the SORFC system may be used to generate various hydrocarbon fuels for storage or sale when the system is not generating power in the fuel cell mode. Alternatively, suitable reactors may be used to convert the hydrogen and carbon oxide containing SORFC electrolysis mode exhaust to the other hydrocarbon gases, such as ethane, propane, octane, formic acid, formaldehyde and/or other suitable hydrocarbon gases.

Figure 9:
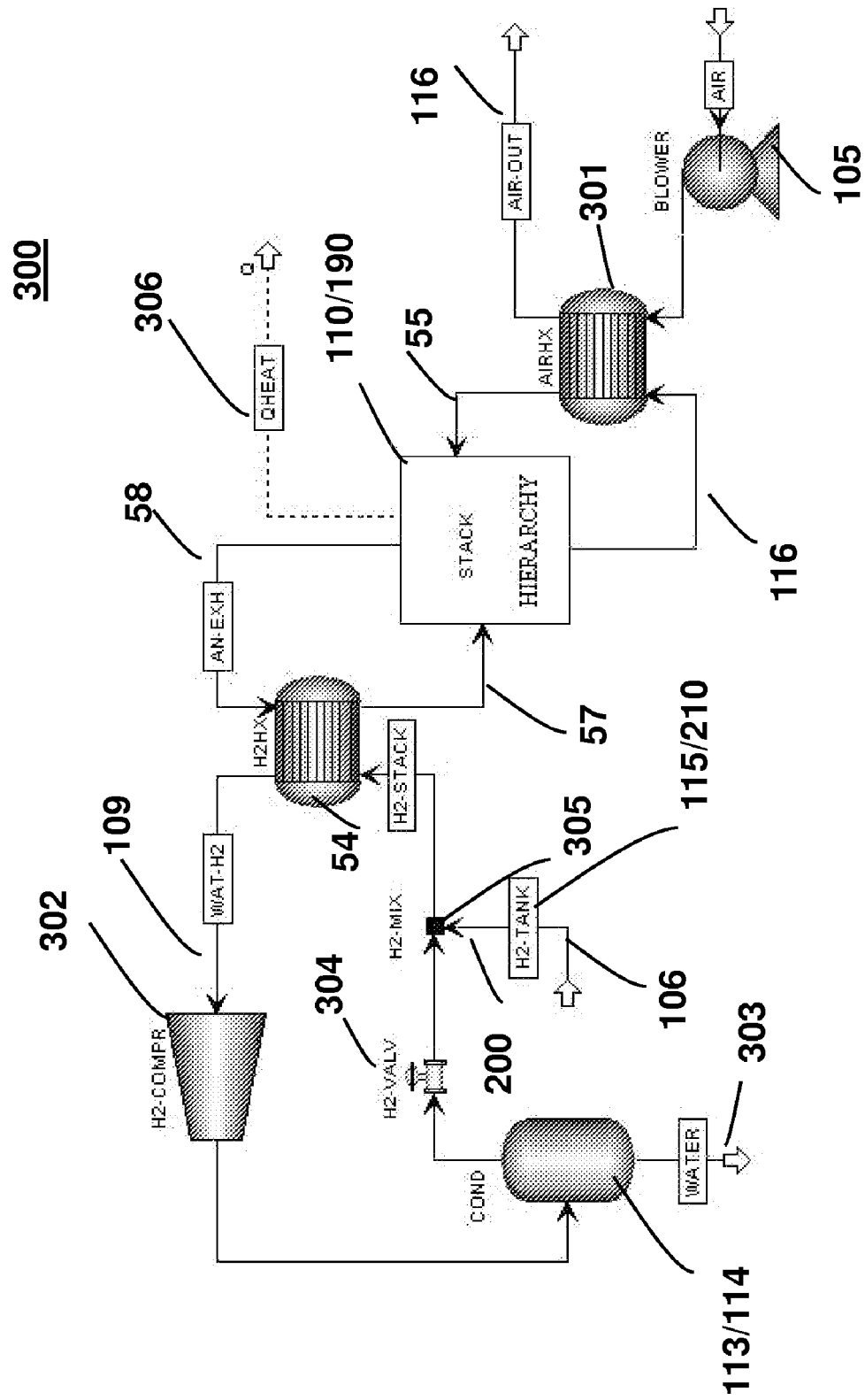
FIG. 9 is a system schematic of the major SORFC components operating in the fuel cell mode, according to another embodiment of the present invention.
Figure 10:
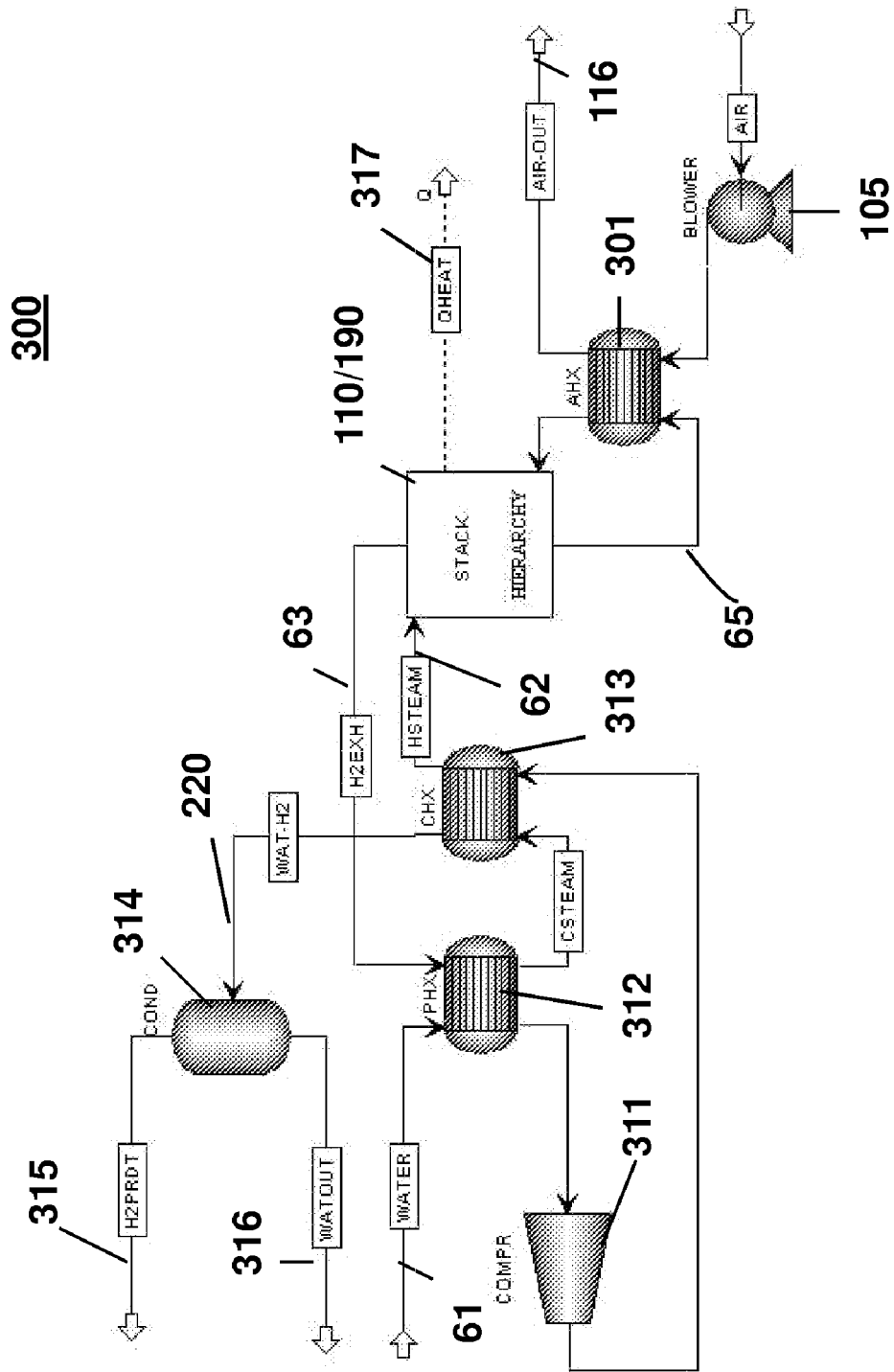
FIG. 10 is a system schematic of the major SORFC components operating in the electrolysis mode, according to another embodiment of the present invention.

FIGS. 9 and 10 illustrate an alternative SORFC electrochemical system 300 configuration according to an alternative embodiment of the present invention. The system shown in FIG. 9 is operating in the fuel cell mode and the system shown in FIG. 10 is operating in the electrolysis mode. Element numbers in FIGS. 9 and 10 that correspond to element numbers in FIGS. 1-8 denote similar elements to those shown in FIGS. 1-8.

As shown in FIG. 9, the fuel cells in the stack 110/190 are operating in the fuel cell mode. The oxidizer provided into the fuel cell stack 110/190 from oxidizer inlet conduit 105 is heated in the air heat exchanger 301 by the cathode or oxidizer exhaust from the fuel cell stack 110/190. The oxidizer exhaust is removed from the system 300 through an oxidizer outlet conduit 116 after providing heat to the oxidizer flowing toward the stack 110/190.

The fuel, such as hydrogen or a hydrocarbon fuel, is provided from fuel inlet 106 and/or from fuel tank 210 through conduits 200, 56 and 57 into the fuel cell stack 110/190. The inlet fuel is heated in the fuel heat exchanger 54 by the anode or fuel exhaust from the stack 110/190. The anode exhaust containing water and unreacted fuel, such as hydrogen, is provided from the fuel cell stack 110/190 through conduit 58, heat exchanger 54 and conduit 109 into a compressor 302. The compressor 302 compresses the anode exhaust and provides it into a hydrogen separator 113/conditioner 114. The separator 113 separates hydrogen from water in the anode exhaust. The water is removed from the system or provided to water storage via conduit 303. The hydrogen is forwarded through valved conduit 304 outside the system 300, back into the hydrogen storage tank 210 and/or back into the fuel cell stack 110/190 through mixer 305. When the fuel cell stack 110/190 is operated below optimum operating efficiency, excess heat 306 is stored, as described above.

As shown in FIG. 10, the fuel cells in the stack 110/190 are operating the electrolysis mode. Water is provided into the system 300 through conduit 61. The input water is heated in heat exchanger 312 and the resulting steam is compressed by compressor 311 and provided into heat exchanger 313. The steam heated in heat exchanger 313 is then provided into the fuel cell stack 110/190 through conduit 62. Oxygen is removed from the system 300 via outlet conduits 65 and 116. Hydrogen and water are exhausted from the fuel cell stack 110/190 through conduit 63 and pass through heat exchangers 312 and 313 to heat the input water. The exhaust is then provided to a separator/conditioner 314 which separates hydrogen from water in the exhaust. The hydrogen and water are separately removed from the system via conduits 315 and 316.

When the fuel cell stack 110/190 is operated below optimum operating efficiency, excess heat 317 is stored, as described above. When the fuel cell stack 110/190 is operated at the optimum operating efficiency, excess heat 317 is provided to the stack 110/190 from external heat sources or from balance of plant components. As an example, waste heat can be extracted from the compressor 311, which might be used when generating hydrogen. If cost of fuel is inexpensive compared to the cost of electricity, it may be advantageous to burn fuel when operating in high or optimum efficiency electrolysis mode, in order to reduce the thermally sustainable voltage of the system, thereby reducing electricity consumption.

Thus, a reversible fuel cell for combined energy storage and fuel generation can be considered to operate in two different modes with multiple operating regimes possible in each mode. For example, a SORFC can be operated in the fuel cell or electrolysis mode. Within each of those modes, there are extremes of maximum efficiency and maximum throughput. By appropriate thermal control, which includes storing or retrieving heat from balance of plant components or from external sources and sinks of heat, an optimum or maximum efficiency and/or maximum throughput points in either or both modes of operation can be extended. By extending the operating regimes, the system can better optimize efficiency or cost as desired based on real time considerations, such as cost of electricity and/or fuel.

The SORFC systems described herein may have other embodiments and configurations, as desired. Other components, such as fuel side exhaust stream condensers, heat exchangers, heat-driven heat pumps, turbines, additional gas separation devices, hydrogen separators which separate hydrogen from the fuel exhaust and provide hydrogen for external use, fuel preprocessing subsystems, fuel reformers and/or water-gas shift reactors, may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell electrochemical system, comprising:
    operating a fuel cell in a fuel cell mode to generate electricity at a first operating efficiency and a first throughput;
    receiving at least one of a cost of electricity and a cost of fuel; and
    adjusting an operating efficiency and throughput of the fuel cell based on the at least one of the received cost of electricity and the received cost of fuel to operate the fuel cell to generate electricity at a second operating efficiency and a second throughput different from the first operating efficiency and the first throughput;
    wherein the at least one of operating efficiency and throughput of the fuel cell is adjusted for operation in the fuel cell mode; and
    wherein the step of adjusting comprises adjusting the operating efficiency in the fuel cell mode to be about equal to an optimum efficiency and adjusting the throughput of the fuel cell to be below an optimum throughput when the cost of electricity is lower than a predetermined cost or the cost of fuel is higher than a predetermined cost.

2. The method of claim 1, wherein the step of adjusting an operating efficiency and throughput of the fuel cell comprises automatically adjusting the fuel cell operating efficiency to the second operating efficiency.

3. The method of claim 1, wherein the second operating efficiency is within 10% of the optimum efficiency.

* * * * *